(12) United States Patent
Tang

(10) Patent No.: US 11,523,356 B2
(45) Date of Patent: *Dec. 6, 2022

(54) INDICATION METHOD, DETECTION METHOD, AND RELATED DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,440

(22) Filed: Feb. 5, 2021

(65) Prior Publication Data

US 2021/0160797 A1     May 27, 2021

Related U.S. Application Data

(63) Continuation of application No. 15/931,193, filed on May 13, 2020, now Pat. No. 10,952,166, which is a
(Continued)

(30) Foreign Application Priority Data

Feb. 14, 2018   (WO) ................ PCT/CN2018/076869

(51) Int. Cl.
*H04W 56/00*     (2009.01)
*H04W 72/00*     (2009.01)
*H04W 72/04*     (2009.01)

(52) U.S. Cl.
CPC ....... *H04W 56/001* (2013.01); *H04W 72/005* (2013.01); *H04W 72/0453* (2013.01); *H04W 72/0493* (2013.01)

(58) Field of Classification Search
CPC ............. H04W 56/001; H04W 72/005; H04W 72/0453; H04W 72/0493
(Continued)

(56) References Cited

U.S. PATENT DOCUMENTS

2018/0337755 A1\* 11/2018 John Wilson ....... H04L 27/2613
2019/0140776 A1   5/2019 Seo et al.
(Continued)

FOREIGN PATENT DOCUMENTS

CN    102263623 A    11/2011
CN    104284423 A    1/2015
(Continued)

OTHER PUBLICATIONS

Examination Report for European Application No. 18906105.4 dated Dec. 23, 2021. 8 pages.
(Continued)

*Primary Examiner* — Gbemileke J Onamuti
(74) *Attorney, Agent, or Firm* — Perkins Coie LLP

(57) ABSTRACT

Implementations of the present disclosure provide an indication method, a detection method, and a related device. In the present disclosure, a network device indicates to user equipment, within what frequency domain ranges there is no SSB transmission, thereby preventing the user equipment from performing useless searches in the frequency domain ranges in which there is no SSB.

16 Claims, 6 Drawing Sheets

Related U.S. Application Data continuation of application No. PCT/CN2018/077802, filed on Mar. 1, 2018.

(58) Field of Classification Search
USPC ............................................. 370/329
See application file for complete search history.

(56) References Cited

U.S. PATENT DOCUMENTS

| | | | |
|---|---|---|---|
| 2019/0200307 | A1 | 6/2019 | Si et al. |
| 2019/0222340 | A1 | 7/2019 | Kaikkonen et al. |
| 2020/0344792 | A1 | 10/2020 | Liu et al. |
| 2020/0404537 | A1 | 12/2020 | Harada |

FOREIGN PATENT DOCUMENTS

| | | |
|---|---|---|
| CN | 106941730 A | 7/2017 |
| EP | 3515123 A1 | 7/2019 |
| WO | 2018213026 A1 | 11/2018 |
| WO | 2019138075 A1 | 7/2019 |

OTHER PUBLICATIONS

Examination report for Indian Application No. 202017036940 dated Nov. 30, 2021. 7 pages with English translation.
Notice of Final Rejection for Korean Application No. 10-2020-7025225 dated Dec. 6, 2021. 8 pages with English translation.
Notice of Reasons for Refusal for Japanese Application No. 2020-543294 dated Nov. 2, 2021. 6 pages with English translation.
CATT, "Remaining details on NR PBCH" 3GPP TSG RAN WG1 Meeting AH 1801, R1-1800998, Vancouver, Canada, Jan. 22-26, 2018. 10 pages.
EPO, Extended European Search Report for European Patent Application No. 18906105.4. dated Apr. 1, 2021. 17 pages.
IPA, Examination Report No. 1 for Australian Patent Application No. 2018409080. dated Mar. 30, 2021. 4 pages.
KIPO, Notification of Reason for Refusal for Korean Patent Application No. 10-2020-7025225. dated Jun. 8, 2021. 15 pages with English translation.
3GPP TSG RAN WG1 Meeting AH 1801—Vancouver, Canada—Jan. 22-26, 2018—R1-1800228—CATT, Remaining details on NR PBCH (8 pages).
3GPP TSG RAN WG1 Meeting AH 1801—Vancouver, Canada—Jan. 22-26, 2018—R1-1800350—LG Electronics, Remaining Details on PBCH design and contents (4 pages).
3GPP TSG RAN WG1 Meeting AH 1801—Vancouver, Canada—Jan. 22-26, 2018—R1-1800413—Samsung, Corrections on NR-PBCH (2 pages).
3GPP TSG RAN WG1 Meeting AH 1801—Vancouver, Canada—Jan. 22-26, 2018—R1-1800508—OPPO, Discussion on synchronization raster indication (3 pages).
3GPP TSG RAN WG1 Meeting AH 1801—Vancouver, Canada—Jan. 22-26, 2018—R1-1800650—NTT DOCOMO, Inc., Remaining issues on NR-PBCH (7 pages).
3GPP TSG RAN WG1 Meeting AH 1801—Vancouver, Canada—Jan. 22-26, 2018—R1-1800847—Qualcomm Incorporated, Remaining details on NR-PBCH (9 pages).
3GPP TSG RAN WG1 Meeting AH 1801—Vancouver, Canada—Jan. 22-26, 2018—R1-1800893—Ericsson, On NR-PBCH (4 pages).
3GPP TSG RAN WG1 NR AH #18-01—Vancouver, Canada—Jan. 22-26, 2018—R1-1800803—Nokia, Nokia Shanghai Bell, Remaining details on NR-PBCH (6 pages).
International Search Report dated Nov. 8, 2018 of PCT/CN2018/077802 (2 pages).
Non-Final Office Action dated Jul. 8, 2020 of U.S. Appl. No. 15/931,193, filed May 13, 2020.
Notice of Allowance dated Oct. 30, 2020 of U.S. Appl. No. 15/931,193, filed May 13, 2020.
3GPP "User Equipment (UE) radio transmission and reception; Part 1: Range 1 Standalone (Release 15)" 3GPP Technical Specification 38.101-1 V15.0.0; Dec. 2017; 49 pages.
Examination Report for European Application No. 18906105.4 dated May 20, 2022. 5 pages.
Huawei et al. "Correction on RMSI configurations" R1-1800030; 3GPP TSG RAN WG1 Ad Hoc Meeting; Vancouver, Canada; Jan. 22-26, 2018. 14 pages.
LG Electronics "Remaining Details on Synchronization signal" R1-1800349; 3GPP TSG RAN WG1 Meeting AH 1801; Vancouver, Canada; Jan. 22-26, 2018. 7 pages.
Nokia et al. "On Remaining System Information Delivery" R1-1800804; 3GPP TSG-RAN WG1 NR AH#18-01; Vancouver, Canada; Jan. 22-26, 2018. 10 pages.
Notification of Reason for Refusal for Korean Application No. 10-2022-7006631 dated May 23, 2022. 12 pages with English translation.
Vivo "Remaining aspects on NR-PBCH" R1-1800173; 3GPP TSG RAN WG1 Meeting AH 1801; Vancouver, Canada; Jan. 22-26, 2018. 7 pages.
ZTE et al. "Remaining details of RMSI" R1-1800080; 3GPP TSG RAN WG1 Meeting AH 1801; Vancouver, Canada; Jan. 22-26, 2018. 14 pages.
Notice of Final Rejection for Korean Application No. 10-2020-7025225 dated Jan. 27, 2022. 10 pages with English translation.
Decision of Refusal dated Jun. 21, 2022 of Japanese Patent Application No. 2020-543294 with English translation (5 pages).

\* cited by examiner

INDICATION METHOD, DETECTION METHOD, AND RELATED DEVICE

CROSS-REFERENCE TO RELATED APPLICATIONS

This application is a continuation application of the U.S. application Ser. No. 15/931,193, filed May 13, 2020, which is the continuation application of International Application No. PCT/CN2018/077802 filed on Mar. 1, 2018, which claims priority to International Application No. PCT/CN2018/076869 filed on Feb. 14, 2018, and the entire disclosures of the above applications are hereby incorporated by reference.

TECHNICAL FIELD

The present disclosure relates to the field of communication technology, specifically to an indication method, a detection method, and a related device.

BACKGROUND

For a User Equipment (UE) which initially accesses, the User Equipment needs to obtain a system message from a network device to access the network device. The system message includes Remaining Minimum System Information (RMSI). The RMSI may be indirectly obtained through a Physical Broadcast Channel (PBCH) of a Synchronization Signal Block (SSB).

At present, it takes too long time in an initial searching process (such as SSB searching), and time required for a user equipment to initially access a network device is increased.

SUMMARY

Implementations of the present disclosure provide an indication method, a detection method, and a related device.

In a first aspect, an implementation of the present disclosure provides an indication method, including: sending, by a network device, an indication to a user equipment, wherein the indication is used to indicate that there is no SSB within a first frequency range.

In a second aspect, an implementation of the present disclosure provides a detection method, including: receiving, by a user equipment, an indication from a network device, wherein the indication is used to indicate that there is no SSB within a first frequency range; and detecting, by the user equipment, the SSB based on the indication.

In a third aspect, an implementation of the present disclosure provides an indication method, including: sending, by a network device, an indication to a user equipment, wherein the indication is used to indicate an SSB exists at a first frequency location.

In a fourth aspect, an implementation of the present disclosure provides a detection method, including: receiving, by a user equipment, an indication from a network device, wherein the indication is used to indicate that an SSB exists at a first frequency location; and detecting, by the user equipment, the SSB based on the indication.

In a fifth aspect, an implementation of the present disclosure provides a network device, including a processing unit and a communication unit, wherein: the processing unit is configured to send an indication to a user equipment through the communication unit, wherein the indication is used to indicate that there is no SSB within a first frequency range.

In a sixth aspect, an implementation of the present disclosure provides a user equipment, including a processing unit and a communication unit, wherein: the processing unit is configured to receive an indication from a network device through the communication unit, wherein the indication is used to indicate that there is no SSB within a first frequency range; and the processing unit is further configured to detect the SSB based on the indication.

In a seventh aspect, an implementation of the present disclosure provides a network device, including a processing unit and a communication unit, wherein: the processing unit is configured to send an indication to a user equipment through the communication unit, wherein the indication is used to indicate that an SSB exists at a first frequency location.

In an eighth aspect, an implementation of the present disclosure provides a user equipment, including a processing unit and a communication unit, wherein: the processing unit is configured to receive an indication from a network device through the communication unit, wherein the indication is used to indicate that an SSB exists at a first frequency location; and the processing unit is further configured to detect the SSB based on the indication.

In a ninth aspect, an implementation of the present disclosure provides a network device, including one or more processors, one or more memories, one or more transceivers, and one or more programs, wherein the one or more programs are stored in the memories and configured to be executed by the one or more processors, and the programs include instructions for performing acts in the method as described in the first aspect.

In a tenth aspect, an implementation of the present disclosure provides a user equipment, including one or more processors, one or more memories, one or more transceivers, and one or more programs, wherein the one or more programs are stored in the memories and configured to be executed by the one or more processors, and the programs include instructions for performing acts in the method as described in the second aspect.

In an eleventh aspect, an implementation of the present disclosure provides a network device, including one or more processors, one or more memories, one or more transceivers, and one or more programs, wherein the one or more programs are stored in the memories and configured to be executed by the one or more processors, and the programs include instructions for performing acts in the method as described in the third aspect.

In a twelfth aspect, an implementation of the present disclosure provides a user equipment, including one or more processors, one or more memories, one or more transceivers, and one or more programs, wherein the one or more programs are stored in the memories and configured to be executed by the one or more processors, and the programs include instructions for performing acts in the method as described in the fourth aspect.

In a thirteenth aspect, an implementation of the present disclosure provides a computer readable storage medium, storing a computer program for electronic data interchange, wherein the computer program enables a computer to execute parts or all of the acts described in the method of the first aspect.

In a fourteenth aspect, an implementation of the present disclosure provides a computer readable storage medium, storing a computer program for electronic data interchange, wherein the computer program enables a computer to execute parts or all of the acts described in the method of the second aspect.

In a fifteenth aspect, an implementation of the present disclosure provides a computer readable storage medium, storing a computer program for electronic data interchange, wherein the computer program enables a computer to execute parts or all of the acts described in the method of the third aspect.

In a sixteenth aspect, an implementation of the present disclosure provides a computer readable storage medium, storing a computer program for electronic data interchange, wherein the computer program enables a computer to execute parts or all of the acts described in the method of the fourth aspect.

In a seventeenth aspect, an implementation of the present disclosure provides a computer program product, wherein the computer program product includes a non-transitory computer readable storage medium storing a computer program, and the computer program is operable to enable a computer to execute parts or all of the acts described in the method of the first aspect. The computer program product may be a software installation package.

In an eighteenth aspect, an implementation of the present disclosure provides a computer program product, wherein the computer program product includes a non-transitory computer readable storage medium storing a computer program, and the computer program is operable to enable a computer to execute parts or all of the acts described in the method of the second aspect. The computer program product may be a software installation package.

In a nineteenth aspect, an implementation of the present disclosure provides a computer program product, wherein the computer program product includes a non-transitory computer readable storage medium storing a computer program, and the computer program is operable to enable a computer to execute parts or all of the acts described in the method of the third aspect. The computer program product may be a software installation package.

In a twentieth aspect, an implementation of the present disclosure provides a computer program product, wherein the computer program product includes a non-transitory computer readable storage medium storing a computer program, and the computer program is operable to enable a computer to execute parts or all of the acts described in the method of the fourth aspect. The computer program product may be a software installation package.

These aspects and other aspects of the present disclosure will be more easily understood from following descriptions of the implementations.

BRIEF DESCRIPTION OF DRAWINGS

To more clearly explain technical solutions in the implementations of the present disclosure or related technology, the following will explain drawings needed in the implementations of the present disclosure or the related technology.

DETAILED DESCRIPTION

Terminologies used in implementation sections of the present disclosure are only for the purpose of explaining specific implementations of the present disclosure, and are not intended to limit the present disclosure.

Terms "first", "second", "third" and "fourth", or the like in the specification, claims and drawings of the present disclosure are used to distinguish different objects and not used to describe a specific order. In addition, terms "include" and "have" and any variations thereof are intended to cover non-exclusive inclusion.

Figure 1A:
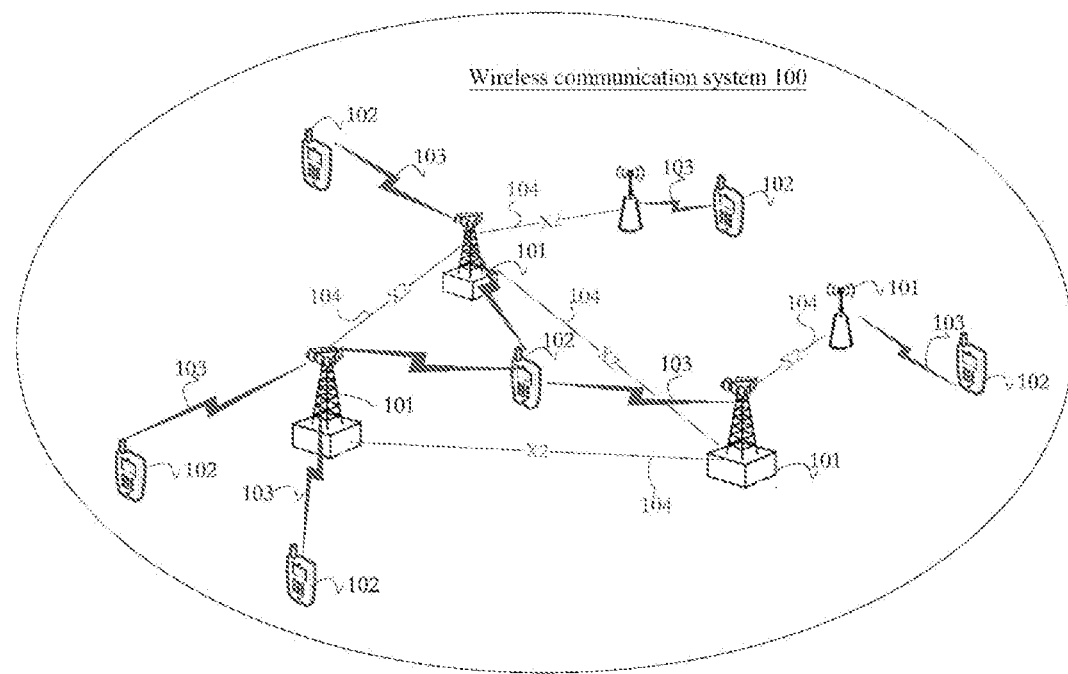
FIG. 1A is a schematic diagram of an architecture of a wireless communication system according to an implementation of the present disclosure.

FIG. 1A shows a wireless communication system provided in the present disclosure. The wireless communication system is not limited to a Long Term Evolution (LTE) system, or may be the 5th Generation (5G) system evolved in the future, a NR system, a Machine to Machine (M2M) system, or the like. As shown in FIG. 1A, a wireless communication system 100 may include: one or more network devices 101 and one or more user equipment 102.

The network device 101 may be a base station, wherein the base station may be configured to communicate with one or more user equipment, or may be configured to communicate with one or more base stations with partial user equipment functions (for example, communication between a macro base station and a micro base station, such as an access point). The base station may be a base transceiver station (BTS) in a time division synchronous code division multiple access (TD-SCDMA) system, or an evolutional node B (eNB) in an LTE system, or a base station in a 5G system or the NR system. In addition, the base station may be an Access Point (AP), a transport point (TRP), a Central Unit (CU), or other network entities, and may include parts or all of functions of the above network entities.

The user equipment 102 may be distributed throughout the whole wireless communication system 100, and may be stationary, or mobile. In some implementations of the present disclosure, the user equipment 102 may be a mobile device, a mobile station, a mobile unit, an M2M terminal, a wireless unit, a remote unit, a user agent, a mobile client, etc.

Specifically, the network device 101 may be used for communicating with the user equipment 102 through a wireless interface 103 under control of a network device controller (not shown). In some implementations, the network device controller may be a part of a core network, or may be integrated into the network device 101. The network device 101 and another network device 101 may also communicate with each other directly or indirectly through a backhaul interface 104 (e.g., an X2 interface).

Figure 1B:
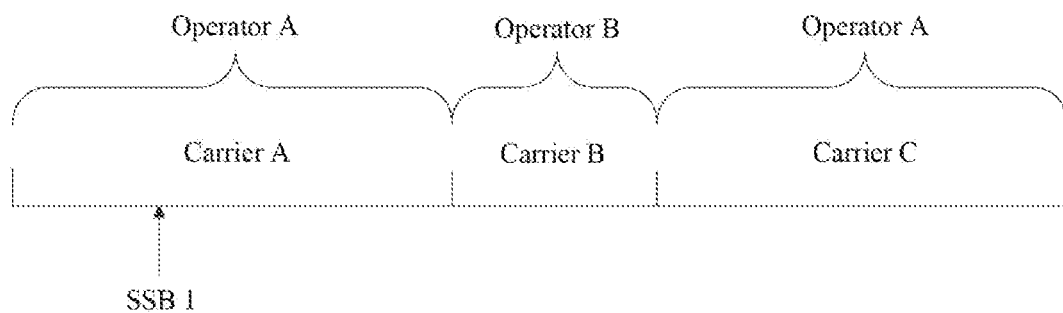
FIG. 1B is a schematic diagram of frequency domain resource allocation according to an implementation of the present disclosure.

Frequency domain resources are allocated among various operators, and different frequency domain resources under one band may be allocated to different operators. As shown in FIG. 1B, carrier A and carrier C are allocated to operator A, and carrier B is allocated to operator B. If a user equipment has searched for SSB1 on carrier A, but SSB1 is not associated with RMSI, then a network device of operator A indicates a frequency location of a cell defining SSB through a PBCH in the SSB1. Assuming that an SSB on carrier A may indicate frequency locations of cell defining SSBs on carrier A to carrier C, since carrier B is a carrier used by operator B, a frequency location of a cell defining SSB contained in which will not be indicated by a network device of operator A, then no SSB associated with RMSI and which the user equipment needs to search for exists in a frequency domain resource in which carrier B is located. If a user equipment searches for a resource in which carrier B is located, the user equipment will be caused to make useless searching within a frequency domain range in which there is no SSB transmission, increasing time required for an initial searching process of the user equipment, and further increasing time required for the user equipment to initially access a network device.

In an implementation of the present disclosure, a network device indicates to a user equipment within which frequency domain range there is no SSB transmission, thus avoiding useless searching by the user equipment within frequency domain ranges in which there is no SSB, accelerating an initial searching process of the user equipment, and further reducing power consumption in the initial searching process.

In another implementation of the present disclosure, a network device indicates to a user equipment on which frequency locations SSB transmission exists, thus avoiding useless searching by the user equipment on frequency locations at which there is no SSB, accelerating an initial searching process of the user equipment, and further reducing power consumption in the initial searching process.

It should be noted that the wireless communication system 100 shown in FIG. 1 is only for more clearly explaining technical solutions of the present disclosure, and does not constitute a limitation to the present disclosure. Those of ordinary skill in the art may know that with evolution of network architecture and emergence of new service scenarios, technical solutions provided by the present disclosure are also applicable to similar technical problems.

Figure 2:
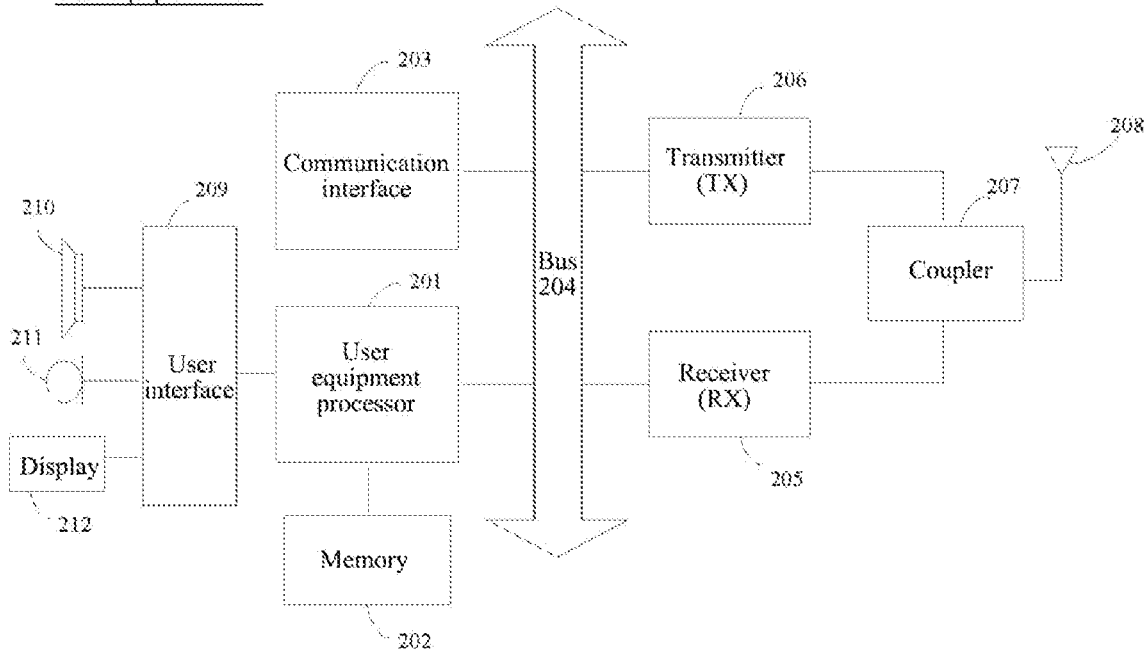
FIG. 2 is a schematic diagram of a structure of a user equipment according to an implementation of the present disclosure.

Refer to FIG. 2, FIG. 2 shows a user equipment 200 according to some implementations of the present disclosure. As shown in FIG. 2, the user equipment 200 may include one or more user equipment processors 201, a memory 202, a communication interface 203, a receiver 205, a transmitter 206, a coupler 207, an antenna 208, a user interface 202, and input and output modules (including an audio input and output module 210, a key input module 211, a display 212, etc.). These components may be connected through a bus 204 or other modes, for example, in FIG. 2, the components are connected through a bus.

The communication interface 203 may be used for communication of the user equipment 200 with other communication devices, such as a network device. Specifically, the network device may be the network device 300 shown in FIG. 3. Specifically, the communication interface 203 may be a communication interface of LTE (4G), or may be a communication interface of 5G or new radio in the future. Not limited to a wireless communication interface, the user equipment 200 may be configured with a wired communication interface 203, such as a Local Access Network (LAN) interface.

The transmitter 206 may be used for performing transmission processing for signals output by the user equipment processor 201, such as, signal modulation. The receiver 205 may be used for performing reception processing on mobile communication signals received by the antenna 208, such as, signal demodulation. In some implementations of the present disclosure, the transmitter 206 and the receiver 205 may be considered as one wireless modem. In the user equipment 200, both a quantity of transmitters 206 and a quantity of receivers 205 may be one or more. The antenna 208 may be used for converting electromagnetic energy in a transmission line into electromagnetic waves in free space, or to converting electromagnetic waves in the free space into electromagnetic energy in the transmission line. The coupler 207 is used for dividing the mobile communication signals received by the antenna 308 into multiple channels and distributing them to multiple receivers 205.

In addition to the transmitter 206 and receiver 205 shown in FIG. 2, the user equipment 200 may also include other communication components, such as, a GPS module, a Bluetooth module, a Wireless Fidelity (Wi-Fi) module. Not limited to the wireless communication signals described above, the user equipment 200 may support other wireless communication signals, such as, satellite signals, short wave signals. Not limited to the wireless communication, the user equipment 200 may be configured with a wired network interface (e.g., a LAN interface) to support wired communication.

The input and output module may be configured to implement an interaction between the user equipment 200 and a user/external environment, and may mainly include an audio input and output module 210, a key input module 211, and a display 212, etc. Specifically, the input and output module may further include a camera, a touch screen, and a sensor, etc. All input and output modules communicate with the user equipment processor 201 through the user interface 209.

The memory 202 is coupled to the terminal processor 201, and used for storing various software programs and/or multiple sets of instructions. Specifically, the memory 202 may include a high-speed random access memory, or may include a non-volatile memory, such as, one or more disk storage devices, flash memory devices, or other non-volatile solid-state storage devices. The memory 202 may store an operating system (hereinafter referred to as a system), such as, an embedded operating system, e.g., ANDROID, IOS, WINDOWS, or LINUX. The memory 202 may store a network communication program that may be used for communication among one or more additional devices, one or more user equipment, and one or more network devices. The memory 202 may store a user interface program that may vividly display contents of application programs through a graphical operating interface, and receive user's control operations for the application programs through input controls, such as, a menu, a dialog box, a key, etc.

In some implementations of the present disclosure, the memory 202 may be configured to store an implementation program of a method for detecting a synchronous signal block at the user equipment 200 side provided by one or more implementations of the present disclosure. As for an implementation of a method for detecting a synchronous signal block according to one or more implementations of the present disclosure, please refer to following method implementations.

In some implementations of the present disclosure, the user equipment processor 201 may be used for reading and executing computer readable instructions. Specifically, the user equipment processor 201 may be configured to call a program stored in the memory 212, such as an implementation program of a method for detecting a synchronous signal block at the user equipment 200 side according to one or more implementations of the present disclosure, and execute instructions contained in the program.

It should be noted that the user equipment 200 shown in FIG. 2 is only an implementation of the implementations of the present disclosure. In actual application, the user equipment 200 may also include more or fewer components, which is not limited here.

Figure 3:
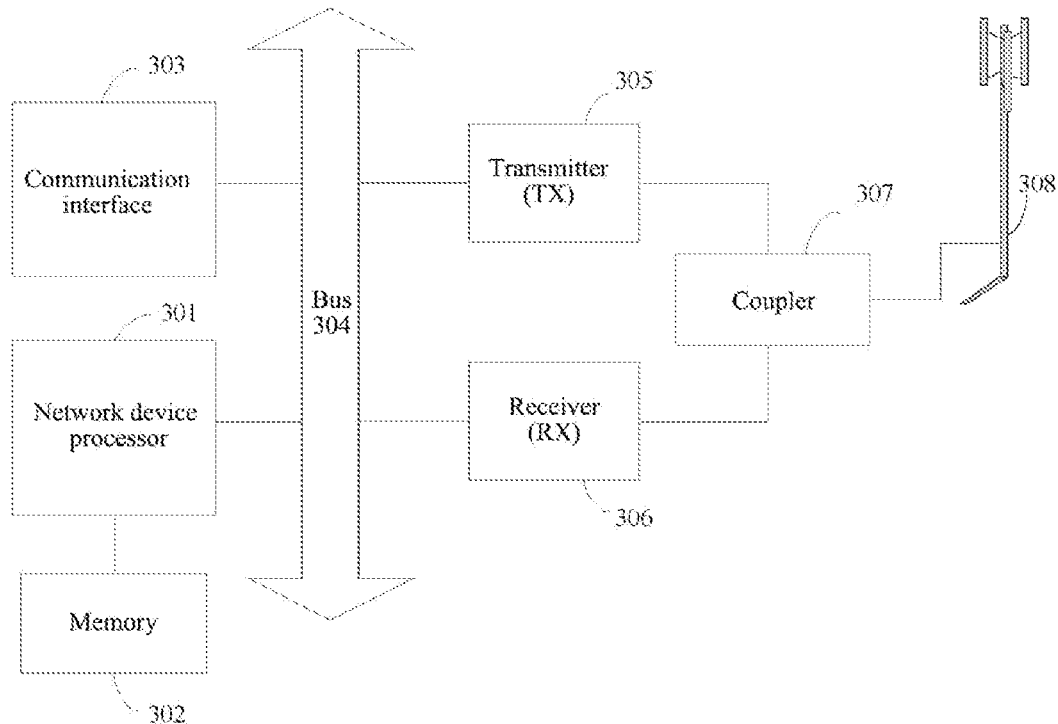
FIG. 3 is a schematic diagram of a structure of a network device according to an implementation of the present disclosure.

Refer to FIG. 3, FIG. 3 shows a network device 300 according to some implementations of the present disclosure. As shown in FIG. 3, the network device 300 may include one or more network device processors 301, a memory 302, a communication interface 303, a transmitter 305, a receiver 306, a coupler 307, and an antenna 308. These components may be connected through a bus 304 or other modes, for example, in FIG. 4, the components are connected through the bus.

The communication interface 303 may be used for communication of the network device 300 with other communication devices, such as, a user equipment or other network devices. Specifically, the user equipment may be the user equipment 200 shown in FIG. 2. Specifically, the communication interface 303 may be a communication interface of LTE (4G), or may be a communication interface of 5G or new radio in the future. Not limited to the wireless communication interface, the network device 300 may be configured with a wired communication interface 303 to support wired communication. For example, backhaul links between one network device 300 and other network devices 300 may be wired communication connections.

The transmitter 305 may be used for performing transmission processing on signals output by the network device processor 301, such as, signal modulation. The receiver 306 may be configured to perform reception processing on a mobile communication signal received by the antenna 308. For example, signal demodulation. In some implementations of the present disclosure, the transmitter 305 and the receiver 306 may be considered as one wireless modem. In the network device 300, both a quantity of transmitters 305 and a quantity of receivers 306 may be one or more. The antenna 308 may be used for converting electromagnetic energy in a transmission line into electromagnetic waves in free space, or to converting electromagnetic waves in the free space into electromagnetic energy in the transmission line. The coupler 307 is used for dividing the mobile communication signals into multiple channels and distributing them to multiple receivers 306.

The memory 302 is coupled to the network device processor 301, and used for storing various software programs and/or multiple sets of instructions. Specifically, the memory 302 may include a high-speed random access memory, or may include a non-volatile memory, such as, one or more disk storage devices, flash memory devices, or other non-volatile solid-state storage devices. The memory 302 may store an operating system (hereinafter referred to as a system), such as an embedded operating system, e.g., uCOS, VxWorks, or RTLinux. The memory 302 may store a network communication program that may be used for communication among one or more additional devices, one or more terminal devices, and one or more network devices.

The network device processor 301 may be used for managing wireless channels, implementing calling and establishing and removing communication links, and providing cell handover control for users in a control area. Specifically, the network device processor 301 may include: an Administration Module/Communication Module (AM/CM) (used as a center for voice path switching and information exchanging), a Basic Module (BM) (configured to complete call processing, signaling processing, radio resource management, wireless link management and a circuit maintenance function), a Transcoder and Submultiplexer (TCSM) (configured to complete multiplexing and demultiplexing and code transformation functions), etc.

In an implementation of the present disclosure, the memory 302 may be configured to store an implementation program of a method for detecting a synchronous signal block at the network device 300 side provided by one or more implementations of the present disclosure. As for an implementation of a method for detecting a synchronous signal block provided by one or more implementations of the present disclosure, please refer to following method implementations.

In implementations of the present disclosure, the network device processor 301 may be used for reading and executing computer readable instructions. Specifically, the network device processor 301 may be configured to call a program stored in the memory 302, such as an implementation program of a method for detecting a synchronous signal block at the network device 300 side according to one or more implementations of the present disclosure, and execute instructions contained in the program.

It should be noted that the network device 300 shown in FIG. 3 is only an implementation of implementations of the present disclosure. In actual application, the network device 300 may include more or fewer components, which is not limited here.

Based on the above-mentioned implementations respectively corresponding to the wireless communication system 100, the user equipment 200 and the network device 300, an implementation of the present disclosure provides a method for detecting a synchronous signal block.

Figure 4A:
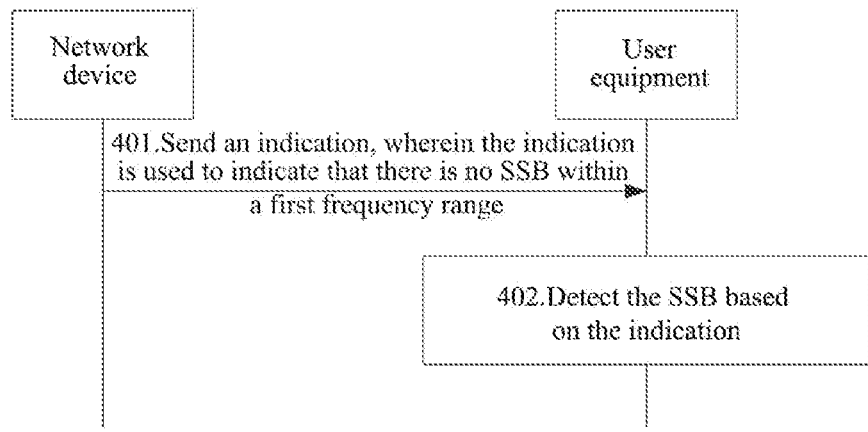
FIG. 4A is a flowchart of a method for detecting a synchronous signal block according to an implementation of the present disclosure.

Please refer to FIG. 4A. FIG. 4A is a flowchart of a method for detecting a synchronous signal block according to an implementation of the present disclosure, including following acts 401 and 402.

In act 401, a network device sends an indication to a user equipment, wherein the indication is used to indicate that there is no SSB within a first frequency range.

In act 402, the user equipment receives the indication from the network device, wherein the indication is used to indicate that there is no SSB within the first frequency range; and the user equipment detects the SSB based on the indication.

Further, the SSB is associated with RMSI.

Herein, the RMSI is bore on a Physical Downlink Shared Channel (PDSCH), Downlink Control Information (DCI) of the PDSCH is bore on a Physical Downlink Control CHannel (PDCCH), a time-frequency resource position in which the PDCCH is located is indicated by a PBCH, and the PBCH also indicates whether an SSB in which the PBCH is located is associated with RMSI. Therefore, RMSI may be obtained by an SSB which is associated with the RMSI.

Specifically, frequency domain resources are allocated among various operators, and different frequency domain resources under one band may be allocated to different operators. As shown in FIG. 1B, carrier A and carrier C are allocated to operator A, and carrier B is allocated to operator B. If the user equipment has searched for SSB1 on carrier A, but SSB1 is not associated with RMSI, then a network device of operator A indicates a frequency location of a cell defining SSB through a PBCH in the SSB1. Assuming that an SSB on carrier A may indicate frequency locations of cell defining SSBs on carrier A to carrier C, since carrier B is a carrier used by operator B, a frequency location of a cell defining SSB contained in which will not be indicated by the network device of operator A, then no SSB associated with RMSI and which the user equipment needs to search for exists in a frequency domain resource in which carrier B is located. If the user equipment searches for a resource in which carrier B is located, the user equipment will be caused to make useless searching within a frequency domain range in which there is no SSB transmission, increasing time required for an initial searching process of the user equipment, and further increasing time required for the user equipment to initially access a network device.

It can be seen that in the present disclosure, a network device indicates to a user equipment within which frequency domain range there is no SSB transmission, thus avoiding useless searching by the user equipment within frequency domain ranges in which there is no SSB, accelerating an initial searching process of the user equipment, and further reducing power consumption in the initial searching process.

In an implementation of the present disclosure, the network device sends an indication to the user equipment, wherein the indication is used to indicate that there is no SSB within a first frequency range, includes: the network device sends a first message to the user equipment, wherein the first message is used to indicate the first frequency range; the network device sends a second message to the user equipment, wherein the second message is used to indicate that there is no SSB within the first frequency range.

In an implementation of the present disclosure, the user equipment receives an indication from the network device, wherein the indication is used to indicate that there is no SSB within a first frequency range, includes: the user equipment receives a first message from the network device, wherein the first message is used to indicate the first frequency range; and the user equipment receives a second message from the network device, wherein the second message is used to indicate that there is no SSB within the first frequency range.

Herein, the first message and the second message may be carried in downlink data sent by the network device to the user equipment, or may be carried in a downlink message sent by the network device to the user equipment, etc., which is not limited here.

Herein, the network device may send the first message and the second message to the user equipment together, or may send the first message and the second message to the user equipment separately.

In an implementation of the present disclosure, the network device carries the first message in a first field in a PBCH, wherein the first field reuses a field for indicating a frequency location of SSB, or the first field reuses a field for Control Resource Set (CORESET) of RMSI.

Specifically, a field (i.e., the above first field) exists in PBCH. In related art, this field is a field for indicating a frequency location of an SSB, or this field is a CORESET field of RMSI. In the present disclosure, since the SSB in which the PBCH is located is not associated with RMSI, this field of the PBCH corresponding to this SSB which is not associated with RMSI is a free field. Therefore, in the present disclosure, the network device may reuse this field to indicate a frequency domain range.

In an implementation of the present disclosure, the network device carries the second message through a reserved value of a Physical Resource Block (PRB) grid offset field of a PBCH.

Specifically, the PBCH carries information for indicating whether an SSB in which the PBCH is located is associated with RMSI. In related art, the network device may indicate there is no RMSI through the reserved value in the PRB grid offset field of the PBCH. The PRB grid offset field includes 8 bits, of which 4 bits are used to indicate an offset between PRB grids between channels or signals of a synchronous signal block and an asynchronous signal block. It can be seen that there are still 4 free bits (i.e. 4 reserved values) remaining in the PRB grid offset field, which may be used to indicate that there is no RMSI. Even if there is one reserved value in the 4 free bits included in the PRB grid offset field to indicate there is no RMSI, then there are still 3 reserved values to indicate other information. Therefore, in the present disclosure, the reserved value in the PRB grid offset field may be used to indicate there is no SSB.

In an implementation of the present disclosure, a mode for indicating the first message includes one of following 1), 2), and 3).

1) The first message includes first information and second information, wherein the first information is used to indicate a starting point of the first frequency range, the second information is used to indicate an ending point of the first frequency range, and a length of the first information is the same as a length of the second information, or a length of the first information is different from that of the second information.

Specifically, assuming that the first message includes 8 bits, which are divided into two parts, wherein when the two parts have a same length, then 4 bits of the 8 bits are used to indicate the ending point of the first frequency range and the other 4 bits of the 8 bits are used to indicate the starting point of the first frequency range; or when the two parts have different lengths, then X (X is an integer greater than or equal to 1) bits of the 8 bits are used to indicate the ending point of the first frequency range, and the other (8 minus X) bits of the 8 bits are used to indicate the starting point of the first frequency range.

2) The first message is used to indicate a starting point of the first frequency range.

Specifically, assume that the first message includes 8 bits, all of which are used to indicate the starting point of the first frequency range.

3) The first message is used to indicate an ending point of the first frequency range.

Specifically, assume that the first message includes 8 bits, all of which are used to indicate the ending point of the first frequency range.

In an implementation of the present disclosure, the indication mode used by the first message is predefined, or the indication mode used by the first message is indicated by the network device through a reserved value in a Physical Resource Block (PRB) grid offset field of a Physical Broadcast Channel (PBCH).

Herein, the indication mode used by the network device and in which the network device indicates the first message through the reserved value in the PRB grid offset field of the PBCH is specifically as shown in Table 1. It can be seen from Table 1 that, if the reserved value in the PRB grid offset field is 25, then the indication mode used by the first message has: 8 bits are all used to indicate the starting point of the first frequency range; and if the reserved value in the PRB grid offset field is 27, then the indication mode used by the first message has: 4 bits are used to indicate the starting point of the first frequency range, and 4 bits are used to indicate the ending point of the first frequency range.

TABLE 1

| Reserved value in a PRB grid offset field | Indication mode used by a first message |
|---|---|
| 25 | 8 bits are all used to indicate a starting point of a first frequency range |
| 26 | 8 bits are all used to indicate an ending point of the first frequency range |
| 27 | 4 bits are used to indicate a starting point of the first frequency range<br>4 bits are used to indicate an ending point of the first frequency range |
| 28 | 2 bits are used to indicate a starting point of the first frequency range<br>6 bits are used to indicate an ending point of the first frequency range |
| 29 | 6 bits are used to indicate a starting point of the first frequency range<br>2 bits are used to indicate an ending point of the first frequency range |
| . | . |
| . | . |
| . | . |

In an implementation of the present disclosure, an indication step size with which the first information indicates the starting point of the first frequency range and/or an indication step size with which the second information indicates the ending point of the first frequency range is predefined, or is indicated by the network device through the reserved value in the PRB grid offset field of the PBCH.

Herein, a specific indication through the reserved value in the PRB grid offset field of the PBCH is as shown in Table 1-1.

TABLE 1-1

| Reserved value in a PRB grid offset field | Indication step size indicating a frequency domain range |
|---|---|
| 25 | Step size 1 |
| 26 | Step size 2 |
| 27 | Step size 3 |
| . | . |
| . | . |
| . | . |

Herein, In Table 1-1, step size 1, step size 2 and step size 3 are agreed on by the network device and the user equipment in advance through a protocol. For example, step size 1 is 5 MHz, step size 2 is 10 MHz, and step size 3 is 20 MHz. Or, in Table 1-1, step size 1, step size 2, and step size 3 are indicated by the network device through other bit values in the PBCH. For example, in an SSB which does not carry RMSI, a bit such as numerology indicating RMSI CORE-SET, Cell-bar, etc., may be used to indicate a step size. For example, a value of a bit indicating numerology of RMSI CORESET being 0 represents step size 1 (e.g., 5 MHZ), and a value of a bit indicating numerology of RMSI CORESET being 1 represents step size 2 (e.g., 10 MHZ), and step size 1 and step size 2 may be agreed on by the network device and the user equipment in advance through a protocol.

In an implementation of the present disclosure, the network device sends an indication to the user equipment, wherein the indication is used to indicate that there is no SSB within a first frequency range, includes: the network device sends a third message to the user equipment, wherein the third message is used to indicate that there is no SSB within the first frequency range.

In an implementation of the present disclosure, the user equipment receives an indication from the network device, wherein the indication is used to indicate that there is no SSB within a first frequency range, includes: the user equipment receives a third message from the network device, wherein the third message is used to indicate that there is no SSB within the first frequency range.

Herein, the third message may be carried in downlink data sent by the network device to the user equipment, or may be carried in a downlink message sent by the network device to the user equipment, etc., which is not limited here.

In an implementation of the present disclosure, the network device carries the third message through a second field in a PBCH, wherein the second field reuses a field for indicating a frequency location of an SSB, or the second field reuses a field for CORESET of RMSI.

In an implementation of the present disclosure, the third message includes multiple first bits, wherein each first bit corresponds to one second frequency domain range, the multiple second frequency domain ranges corresponding to the multiple first bits constitute a frequency band which can be indicated by a PBCH, and when a value of the first bit x is equal to a first set value, the second frequency domain range corresponding to the first bit x is the first frequency range, and the first bit x is one of the multiple bits.

Herein, the first set value may be 1 or 0.

Figure 4B:
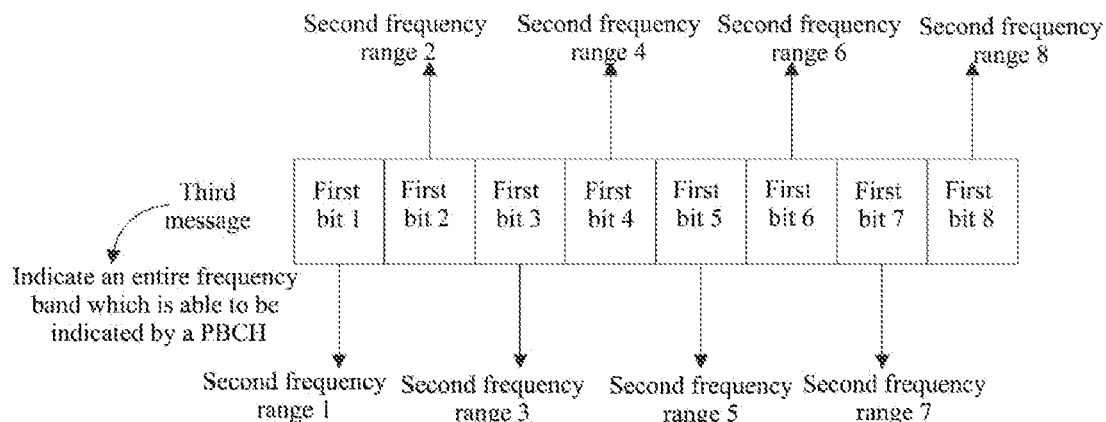
FIG. 4B is an indication diagram of a third message according to an implementation of the present disclosure.

Specifically, as shown in FIG. 4B, the third message includes 8 bits, the first bit 1 corresponds to the second frequency domain range 1, the first bit 2 corresponds to the second frequency domain range 2, the first bit 3 corresponds to the second frequency domain range 3, . . . , and the first bit 8 corresponds to the second frequency domain range 8. The second frequency domain range 1+the second frequency domain range 2+the second frequency domain range 3+ . . . +the second frequency domain range 8=an entire frequency band which can be indicated by a PBCH. Assuming that the first set value is 1, the value of the first bit 1 is 1, the value of the first bit 2 is 0, the value of the first bit 3 is 1, the value of the first bit 4 is 1, the value of the first bit 5 is 0, the value of the first bit 6 is 0, the value of the first bit 7 is 1, and the value of the first bit 8 is 0, then the frequency domain ranges in which there is no SSB have: the second frequency domain range 1, the second frequency domain range 3, the second frequency domain range 4, and the second frequency domain range 7.

In an implementation of the present disclosure, the multiple second frequency domain ranges have a proportional relationship, wherein the proportional relationship is predefined. Herein, the above proportional relationship may be 1:1:1:1:1:1:1:1, or may be 0.2:0.1:0.1:0.1:0.2:0.1:0.1:0.1, or other values, which is not limited here.

Herein, the above proportional relationship may be predefined by a standard protocol, or may be agreed on by the network device and the user equipment in advance, etc., which is not limited here.

In an implementation of the present disclosure, the third message includes multiple second bits, wherein each second bit corresponds to one third frequency domain range, the multiple third frequency domain ranges corresponding to the multiple second bits constitute a fourth frequency domain range, a frequency band which can be indicated by a PBCH includes the fourth frequency domain range, and when a value of the second bit y is equal to a second set value, the third frequency domain range corresponding to the second bit y is the first frequency range, and the second bit y is one of the multiple bits.

Herein, the second set value may be 1 or 0.

Figure 4C:
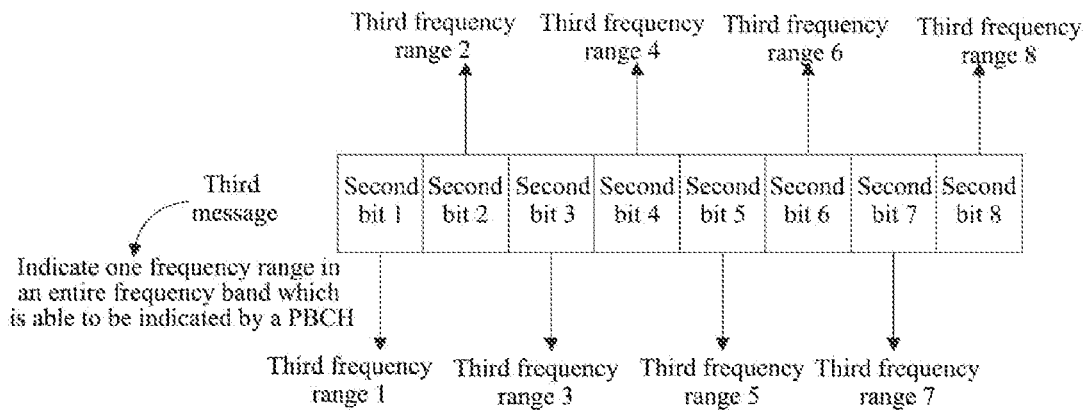
FIG. 4C is an indication diagram of another third message according to an implementation of the present disclosure.
Figure 4D:
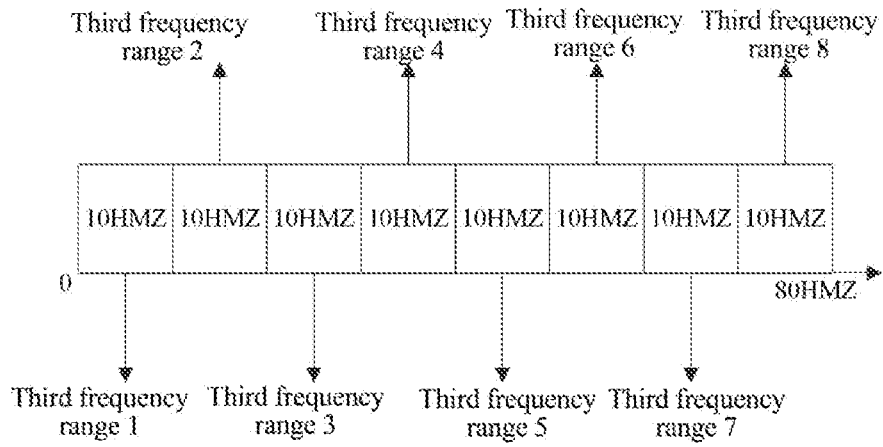
FIG. 4D is a schematic diagram of a frequency domain width according to an implementation of the present disclosure.
Figure 4E:
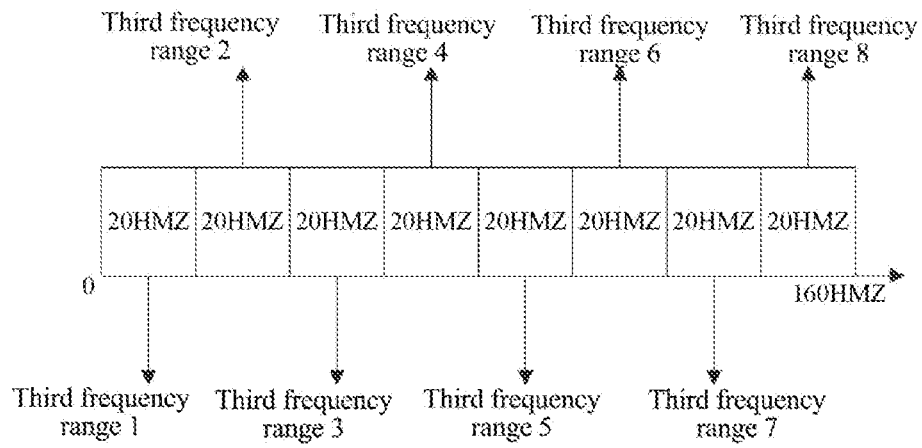
FIG. 4E is a schematic diagram of another frequency domain width according to an implementation of the present disclosure.

Specifically, as shown in FIG. 4C, the third message includes 8 bits, the second bit 1 corresponds to the third frequency domain range 1, the second bit 2 corresponds to the third frequency domain range 2, the second bit 3 corresponds to the third frequency domain range 3, . . . , and the second bit 8 corresponds to the third frequency domain range 8. The third frequency domain range 1+the third frequency domain range 2+the third frequency domain range 3+ . . . +the third frequency domain range 8=the fourth frequency band range, wherein the fourth frequency band range is a frequency range in an entire frequency band which can be indicated by a PBCH. Assuming that the second set value is 1, the value of the second bit 1 is 1, the value of the second bit 2 is 0, the value of the second bit 3 is 1, the value of the second bit 4 is 1, the value of the second bit 5 is 0, the value of the second bit 6 is 0, the value of the second bit 7 is 1, and the value of the second bit 8 is 0, then the frequency domain ranges in which there is no SSB have: the third frequency domain range 1, the third frequency domain range 3, the third frequency domain range 4, and the third frequency domain range 7.

In an implementation of the present disclosure, frequency domain widths of the multiple third frequency domain ranges are the same, for example, the frequency domain widths of the multiple third frequency domain ranges are all 10 MHZ, or 20 MHZ, or 30 MHZ, etc. Or, the frequency domain widths of the multiple third frequency domain ranges are partially different, for example, the multiple third frequency domain ranges include 8 third frequency domain ranges, 3 of the 8 third frequency domain ranges have a frequency domain width of 10 MHZ, 3 of the 8 third frequency domain ranges have a frequency domain width of 20 MHZ, and 2 of the 8 third frequency domain ranges have a frequency domain width of 30 MHZ. Or, the frequency domain widths of the multiple third frequency domain ranges are different from each other, for example, the multiple third frequency domain ranges include 8 third frequency domain ranges, and frequency domain widths of the 8 third frequency domain ranges are respectively: 5 MHZ, 10 MHZ, 15 MHZ, 20 MHZ, 25 MHZ, 30 MHZ, 35 MHZ, and 40 MHZ.

In an implementation of the present disclosure, when the frequency domain widths of the multiple third frequency domain ranges are the same, the frequency domain width of the third frequency domain range is predefined, or the frequency domain width of the third frequency domain range is indicated by the network device through the reserved value in the PRB grid offset field of the PBCH.

Herein, the network device indicates the frequency domain width of the third frequency domain range through the reserved value in the PRB grid offset field of the PBCH, specifically as shown in Table 2. It can be seen from Table 2, if the reserved value in the PRB grid offset field is 25, then the frequency domain width of the third frequency domain range is 5 MHz; and if the reserved value in the PRB grid offset field is 27, then the frequency domain width of the third frequency domain range is 15 MHZ.

TABLE 2

| Reserved value in a PRB grid offset field | Frequency domain width of a third frequency domain range |
|---|---|
| 25 | 5 MHZ |
| 26 | 10 MHZ |
| 27 | 15 MHZ |
| 28 | 20 MHZ |
| 29 | 25 MHZ |
| . | . |
| . | . |
| . | . |

In an implementation of the present disclosure, a positional relationship between the fourth frequency domain range and an SSB contained in the PBCH is predefined, or a positional relationship between the fourth frequency domain range and an SSB contained in the PBCH is indicated by the network device through a reserved value in a Physical Resource Block (PRB) grid offset field of a Physical Broadcast Channel (PBCH).

In an implementation of the present disclosure, the positional relationship between the fourth frequency domain range and the SSB included in the PBCH is indicated by the network device through the reserved value in the PRB grid offset field of the PBCH, specifically has: when the frequency domain widths of the multiple third frequency domain ranges are the same, the network device indicates, through the reserved value in the PRB grid offset field of the PBCH, the frequency domain width of the third frequency domain range and a position of the SSB, in which the PBCH is located, in the fourth frequency domain range.

Specifically, as shown in Table 3, it can be seen from Table 3 that if the reserved value in the PRB grid offset field is 25, then the frequency domain width of the third frequency domain range is 10 MHZ, and assuming that the multiple third frequency domain ranges include 8 third frequency domain ranges, then the frequency domain width of the fourth frequency domain range is 80 MHZ, and the position of the SSB in which PBCH is located in the fourth frequency domain range is within a frequency range of 10 MHZ from a starting frequency of the fourth frequency domain range to after the starting frequency of the fourth frequency domain range. As can be learn from FIG. 4D, the SSB in which the PBCH is located is within the third frequency domain range 1; if the reserved value in the PRB grid offset field is 29, then the frequency domain width of the third frequency domain range is 20 MHZ, and assume that the multiple third frequency domain ranges include 8 third frequency domain ranges, then the frequency domain width of the fourth frequency domain range is 160 MHZ, and the position of the SSB in which PBCH is located in the fourth frequency domain range is within a frequency range of 20 MHZ from the starting frequency of the fourth frequency domain range to after the starting frequency of the fourth frequency domain range. As can be learn from FIG. 4E, the SSB in which the PBCH is located is within the third frequency domain range 1.

TABLE 3

| Reserved value in a PRB grid offset field | Frequency domain width | Position of an SSB in which a PBCH is located in a fourth frequency domain range |
|---|---|---|
| 25 | 10 MHZ | ⅛ |
| 26 | 10 MHZ | ¼ |
| 27 | 10 MHZ | ½ |
| 28 | 10 MHZ | ¾ |
| 29 | 20 MHZ | ⅛ |
| 30 | 20 MHZ | ¼ |
| 31 | 20 MHZ | ½ |
| 32 | 20 MHZ | ¾ |

In an implementation of the present disclosure, the positional relationship between the fourth frequency domain range and the SSB included in the PBCH is indicated by the network device through the reserved value in the PRB grid offset field of the PBCH, specifically has: when the frequency domain widths of the multiple third frequency domain ranges are partially different, or when the frequency domain widths of the multiple third frequency domain ranges are different from each other, the network device indicates, through the reserved value in the PRB grid offset field of the PBCH, the frequency domain width of the third frequency domain range i and the position of the SSB in which the PBCH is located in the fourth frequency domain range, and the third frequency domain range i is one of the multiple third frequency domain ranges.

Specifically, as shown in Table 4, assuming that the third frequency domain range i is the first third frequency domain range, it may be seen from Table 4 that if the reserved value in the PRB grid offset field is 25, then the frequency domain width of the first third frequency domain range is 10 MHZ, and the SSB in which the PBCH is located is located in the first third frequency domain range, specifically as shown in FIG. 4F; and if the reserved value in the PRB grid offset field is 30, then the frequency domain width of the first third frequency domain range is 20 MHZ, and the SSB in which the PBCH is located is located in the 2nd third frequency domain range, specifically as shown in FIG. 4G.

TABLE 4

| Reserved value in a PRB grid offset field | Frequency domain width of a third frequency domain range i | SSB in which a PBCH is located is located in a K-th third frequency domain range |
|---|---|---|
| 25 | 10 MHZ | 1 |
| 26 | 10 MHZ | 3 |
| 27 | 10 MHZ | 5 |
| 28 | 10 MHZ | 7 |
| 29 | 20 MHZ | 1 |
| 30 | 20 MHZ | 3 |
| 31 | 20 MHZ | 5 |
| 32 | 20 MHZ | 7 |

In an implementation of the present disclosure, the positional relationship between the fourth frequency domain range and the SSB included in the PBCH is indicated by the network device through the reserved value in the PRB grid offset field of the PBCH, specifically has: when the frequency domain widths of the multiple third frequency domain ranges are partially different, or when the frequency domain widths of the multiple third frequency domain ranges are different from each other, the network device indicates, through the reserved value in the PRB grid offset field of the PBCH, the position of the SSB in which the PBCH is located in the fourth frequency domain range.

Specifically, as shown in Table 5, it can be seen from Table 5 that if the reserved value in a PRB grid offset field is 25, then the SSB in which the PBCH is located is located in the first third frequency domain range; and if the reserved value in the PRB grid offset field is 30, then the SSB in which the PBCH is located is in the 6th third frequency domain range.

TABLE 5

| Reserved value in a PRB grid offset field | SSB in which a PBCH is located is located in a K-th third frequency domain range |
|---|---|
| 25 | 1 |
| 26 | 2 |
| 27 | 3 |
| 28 | 4 |
| 29 | 5 |
| 30 | 6 |
| 31 | 7 |
| 32 | 8 |

Based on the above-mentioned implementations respectively corresponding to the wireless communication system 100, the user equipment 200 and the network device 300, an implementation of the present disclosure provides a method for detecting a synchronous signal block.

Figure 5:
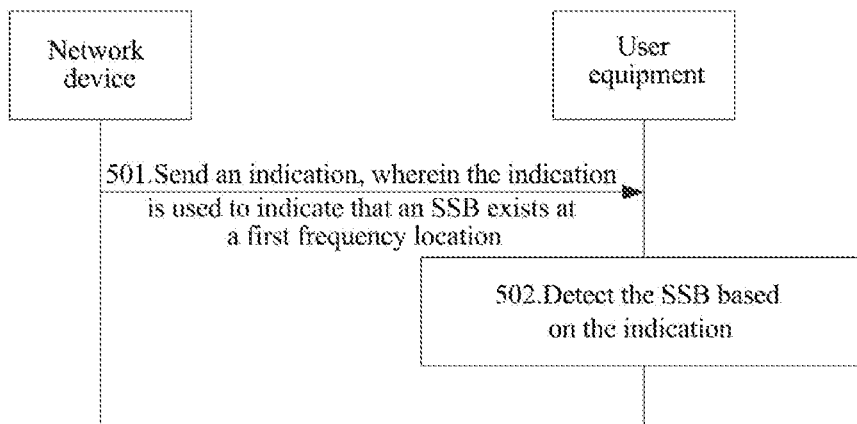
FIG. 5 is a flowchart of another method for detecting a synchronous signal block according to an implementation of the present disclosure.

Please refer to FIG. 5. FIG. 5 is a flowchart of a method for detecting a synchronous signal block according to an implementation of the present disclosure, including following acts S501 and S502.

In act 501, a network device sends an indication to a user equipment, wherein the indication is used to indicate that an SSB exists at a first frequency location.

In act 502, the user equipment receives the indication from the network device; and the user equipment detects the SSB based on the indication.

Further, the SSB is associated with RMSI.

Herein, the RMSI is bore on a PDSCH, DCI of the PDSCH is bore on a PDCCH, a time-frequency resource position at which the PDCCH is located is indicated by a PBCH, and the PBCH also indicates whether an SSB in which the PBCH is located is associated with RMSI. Therefore, RMSI may be obtained by an SSB which is associated with the RMSI.

Specifically, frequency domain resources are allocated among various operators, and different frequency domain resources under one band may be allocated to different operators. As shown in FIG. 1B, carrier A and carrier C are allocated to operator A, and carrier B is allocated to operator B. If the user equipment has searched for SSB1 on carrier A, but SSB1 is not associated with RMSI, then the network device of operator A indicates a frequency location of a cell defining SSB through a PBCH in the SSB1. Assuming that an SSB on carrier A may indicate frequency locations of cell defining SSBs on carrier A to carrier C, since carrier B is a carrier used by operator B, a frequency location of a cell defining SSB contained in which will not be indicated by a network device of operator A, then no SSB associated with RMSI and which the user equipment needs to search for exists in a frequency domain resource in which carrier B is located. If the user equipment searches for a resource in which carrier B is located, the user equipment will be caused to make useless searching within a frequency domain range in which there is no SSB transmission, rising a time required for an initial searching process of the user equipment, and further rising a time required for the user equipment to initially access a network device.

It can be seen that in the present disclosure, a network device indicates to a user equipment on which frequency locations SSB transmission exists, thus avoiding useless searching by the user equipment on frequency locations at which there is no SSB, accelerating an initial searching process of the user equipment, and further reducing power consumption in the initial searching process.

In an implementation of the present disclosure, the network device sends the indication to the user equipment, wherein the indication is used to indicate that the SSB exists at the first frequency location, includes: the network device sends a first message to the user equipment, wherein the first message is used to indicate the first frequency location; and the network device sends a second message to the user equipment, wherein the second message is used to indicate that the SSB exists at the first frequency location.

In an implementation of the present disclosure, the user equipment receives the indication from the network device, wherein the indication is used to indicate that the SSB exists at the first frequency location, includes: the user equipment receives a first message from the user equipment, wherein the first message is used to indicate the first frequency location; and the user equipment receives a second message from the user equipment, wherein the second message is used to indicate that the SSB exists at the first frequency location.

Herein, the first message and the second message may be carried in downlink data sent by the network device to the user equipment, or may be carried in a downlink message sent by the network device to the user equipment, etc., which is not limited here.

Herein, the network device may send the first message and the second message to the user equipment together, or send the first message and the second message to the user equipment separately.

In an implementation of the present disclosure, the network device carries the first message in a first field in a PBCH, wherein the first field reuses a field for indicating a frequency location of an SSB, or the first field reuses a field for CORESET of RMSI.

Specifically, a field (i.e., the above first field) exists in PBCH. In related art, this field is a field for indicating a frequency location of an SSB, or this field is a CORESET field of RMSI. In the present disclosure, since the SSB in which the PBCH is located is not associated with RMSI, this field of the PBCH corresponding to this SSB which is not associated with RMSI is a free field. Therefore, in the present disclosure, the network device may reuse this field to indicate a frequency domain range.

In an implementation of the present disclosure, the network device carries the second message through a reserved value in a Physical Resource Block (PRB) grid offset field of a Physical Broadcast Channel (PBCH).

Specifically, the PBCH carries information for indicating whether an SSB in which the PBCH is located is associated with RMSI. In related art, the network device may indicate that there is no RMSI through a reserved value in a Physical Resource Block (PRB) grid offset field of a Physical Broadcast Channel (PBCH). The PRB grid offset field includes 8 bits, of which 4 bits are used to indicate an offset between PRB grids between channels or signals of a synchronous signal block and an asynchronous signal block. It can be seen that there are still 4 free bits (i.e. 4 reserved values) remaining in the PRB grid offset field, which may be used to indicate that there is no RMSI. Even if there is one reserved value in the 4 free bits included in the PRB grid offset field to indicate that there is no RMSI, then there are still 3 reserved values to indicate other information. Therefore, in the present disclosure, the reserved value in the PRB grid offset field may be used to indicate that there is no SSB.

In an implementation of the present disclosure, the first message includes frequency location information, wherein the frequency location information includes position information, and the frequency location information indicates an absolute position of an SSB synchronization grid within the first frequency range; or, the frequency location information includes a frequency domain offset, wherein the frequency domain offset is an interval between a synchronization grid at which the first frequency location is located and a synchronization grid corresponding to an SSB in which a PBCH is located.

Figure 6:
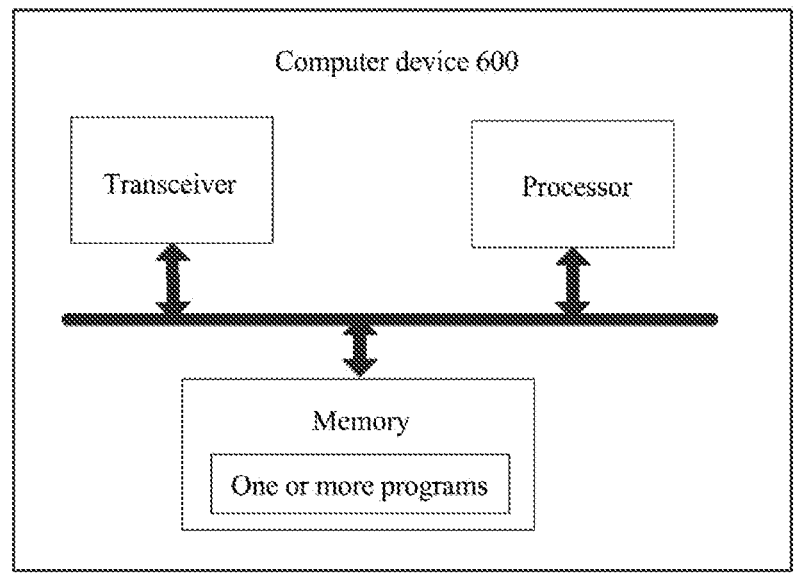
FIG. 6 is a schematic diagram of a structure of a computer device according to an implementation of the present disclosure.

Please refer to FIG. 6. FIG. 6 is a computer device 600 provided by an implementation of the present disclosure. The computer device 600 is applied to a communication system including a network device and a user equipment, the computer device 600 may be a user equipment or a network device, the computer device 600 includes one or more processors, one or more memories, one or more transceivers, and one or more programs; and the one or more programs are stored in the memories, and configured to be executed by the one or more processors.

In an implementation, when the computer device 600 is a network device, the programs include instructions for executing following acts: sending an indication to a user equipment, wherein the indication is used to indicate that there is no SSB within a first frequency range.

Optionally, the SSB is associated with RMSI.

Optionally, in an aspect of sending an indication to a user equipment, wherein the indication is used to indicate that there is no SSB within a first frequency range, the programs include instructions specifically for executing following acts: sending a first message to the user equipment, wherein the first message is used to indicate the first frequency range; and sending a second message to the user equipment, wherein the second message is used to indicate that there is no SSB within the first frequency range.

Optionally, the network device carries the first message in a first field in a PBCH, wherein the first field reuses a field for indicating a frequency location of an SSB, or the first field reuses a field for CORESET of RMSI.

Optionally, the network device carries the second message through a reserved value in a Physical Resource Block (PRB) grid offset field of a Physical Broadcast Channel (PBCH).

Optionally, an indication mode of the first message includes one of following: 1) the first message includes first information and second information, wherein the first information is used to indicate a starting point of the first frequency range, the second information is used to indicate an ending point of the first frequency range, and a length of the first information is the same as a length of the second information, or a length of the first information is different from that of the second information; 2) the first message is used to indicate a starting point of the first frequency range; 3) the first message is used to indicate an ending point of the first frequency range.

Optionally, the indication mode used by the first message is predefined, or the indication mode used by the first message is indicated by the network device through a reserved value in a Physical Resource Block (PRB) grid offset field of a Physical Broadcast Channel (PBCH).

Optionally, an indication step size with which the first information indicates the starting point of the first frequency range and/or an indication step size with which the second information indicates the ending point of the first frequency range is predefined, or is indicated by the network device through the reserved value in the PRB grid offset field of the PBCH.

Optionally, in an aspect of sending an indication to a user equipment, wherein the indication is used to indicate that there is no SSB within a first frequency range, the programs include instructions specifically for executing following acts: sending a third message to the user equipment, wherein the third message is used to indicate that there is no SSB within the first frequency range.

Optionally, the network device carries the third message through a second field in a PBCH, wherein the second field reuses a field for indicating a frequency location of an SSB, or the second field reuses a field for CORESET of RMSI.

Optionally, the third message includes multiple first bits, wherein each first bit corresponds to one second frequency domain range, the multiple second frequency domain ranges corresponding to the multiple first bits constitute a frequency band which can be indicated by a PBCH, and when a value of the first bit x is equal to a first set value, the second frequency domain range corresponding to the first bit x is the first frequency range, and the first bit x is one of the multiple bits.

Optionally, the multiple second frequency domain ranges have a proportional relationship, wherein the proportional relationship is predefined.

Optionally, the third message includes multiple second bits, wherein each second bit corresponds to one third frequency domain range, the multiple third frequency domain ranges corresponding to the multiple second bits constitute a fourth frequency domain range, a frequency band which can be indicated by a PBCH includes the fourth frequency domain range, and when a value of the second bit y is equal to a second set value, the third frequency domain range corresponding to the second bit y is the first frequency range, and the second bit y is one of the multiple bits.

Optionally, frequency domain widths of the multiple third frequency domain ranges are the same, or frequency domain widths of the multiple third frequency domain ranges are partially different, or frequency domain widths of the multiple third frequency domain ranges are different from each other.

Optionally, when the frequency domain widths of the multiple third frequency domain ranges are the same, the frequency domain width of the third frequency domain range is predefined, or the frequency domain width of the third frequency domain range is indicated by the network device through the reserved value in the PRB grid offset field of the PBCH.

Optionally, a positional relationship between the fourth frequency domain range and an SSB contained in the PBCH is predefined, or a positional relationship between the fourth frequency domain range and an SSB contained in the PBCH is indicated by the network device through a reserved value in a Physical Resource Block (PRB) grid offset field of a Physical Broadcast Channel (PBCH).

Optionally, the positional relationship between the fourth frequency domain range and the SSB included in the PBCH is indicated by the network device through the reserved value in the PRB grid offset field of the PBCH, includes one of following: 1) when frequency domain widths of the multiple third frequency domain ranges are the same, the network device indicates, through the reserved value in the PRB grid offset field of the PBCH, the frequency domain width of the third frequency domain range and a position of an SSB in which the PBCH is located in the fourth frequency domain range; 2) when frequency domain widths of the multiple third frequency domain ranges are partially different, or when frequency domain widths of the multiple third frequency domain ranges are different from each other, the network device indicates, through the reserved value in the PRB grid offset field of the PBCH, the frequency domain width of the third frequency domain range i and a position of an SSB in which the PBCH is located in the fourth frequency domain range, and the third frequency domain range i is one of the multiple third frequency domain ranges; and 3) when frequency domain widths of the multiple third frequency domain ranges are partially different, or when frequency domain widths of the multiple third frequency domain ranges are different from each other, the network device indicates, through the reserved value in the PRB grid offset field of the PBCH, a position of an SSB in which the PBCH is located in the fourth frequency domain range.

In an implementation, when the computer device 600 is a user equipment, the programs include instructions for performing following acts: receiving an indication from a network device, wherein the indication is used to indicate that there is no SSB within a first frequency range; and detecting the SSB based on the indication.

Optionally, the SSB is associated with RMSI.

Optionally, in an aspect of receiving an indication from a network device, wherein the indication is used to indicate that there is no SSB within a first frequency range, the programs include instructions specifically for performing following acts: receiving a first message from the network device, wherein the first message is used to indicate the first frequency range; and receiving a second message from the network device, wherein the second message is used to indicate that there is no SSB within the first frequency range.

Optionally, the network device carries the first message in a first field in a PBCH, wherein the first field reuses a field for indicating a frequency location of an SSB, or the first field reuses a field for CORESET of RMSI.

Optionally, the network device carries the second message through a reserved value in a Physical Resource Block (PRB) grid offset field of a Physical Broadcast Channel (PBCH).

Optionally, an indication mode of the first message includes one of following: 1) the first message includes first information and second information, wherein the first information is used to indicate a starting point of the first frequency range, the second information is used to indicate an ending point of the first frequency range, and a length of the first information is the same as a length of the second information, or a length of the first information is different from that of the second information; 2) the first message is used to indicate a starting point of the first frequency range; 3) the first message is used to indicate an ending point of the first frequency range.

Optionally, the indication mode used by the first message is predefined, or the indication mode used by the first message is indicated by the network device through a reserved value in a Physical Resource Block (PRB) grid offset field of a Physical Broadcast Channel (PBCH).

Optionally, an indication step size with which the first information indicates the starting point of the first frequency range and/or an indication step size with which the second information indicates the ending point of the first frequency range is predefined, or is indicated by the network device through the reserved value in the PRB grid offset field of the PBCH.

Optionally, in an aspect of receiving an indication from a network device, wherein the indication is used to indicate that there is no SSB within a first frequency range, the programs include instructions specifically for performing following acts: receiving a third message from the network device, wherein the third message is used to indicate that there is no SSB within the first frequency range.

Optionally, the network device carries the third message through a second field in a PBCH, wherein the second field reuses a field for indicating a frequency location of an SSB, or the second field reuses a field for CORESET of RMSI.

Optionally, the third message includes multiple first bits, wherein each first bit corresponds to one second frequency domain range, the multiple second frequency domain ranges corresponding to the multiple first bits constitute a frequency band which can be indicated by a PBCH, and when a value of the first bit x is equal to a first set value, the second frequency domain range corresponding to the first bit x is the first frequency range, and the first bit x is one of the multiple bits.

Optionally, the multiple second frequency domain ranges have a proportional relationship, wherein the proportional relationship is predefined.

Optionally, the third message includes multiple second bits, wherein each second bit corresponds to one third frequency domain range, the multiple third frequency domain ranges corresponding to the multiple second bits constitute a fourth frequency domain range, a frequency band which can be indicated by a PBCH includes the fourth frequency domain range, and when a value of the second bit y is equal to a second set value, the third frequency domain range corresponding to the second bit y is the first frequency range, and the second bit y is one of the multiple bits.

Optionally, frequency domain widths of the multiple third frequency domain ranges are same, or frequency domain widths of the multiple third frequency domain ranges are partially different, or frequency domain widths of the multiple third frequency domain ranges are different from each other.

Optionally, when the frequency domain widths of the multiple third frequency domain ranges are the same, the frequency domain width of the third frequency domain range is predefined, or the frequency domain width of the third frequency domain range is indicated by the network device through the reserved value in the PRB grid offset field of the PBCH.

Optionally, a positional relationship between the fourth frequency domain range and an SSB contained in the PBCH is predefined, or a positional relationship between the fourth frequency domain range and an SSB contained in the PBCH is indicated by the network device through a reserved value in a Physical Resource Block (PRB) grid offset field of a Physical Broadcast Channel (PBCH).

Optionally, the positional relationship between the fourth frequency domain range and the SSB included in the PBCH is indicated by the network device through the reserved value in the PRB grid offset field of the PBCH, includes one of following: 1) when frequency domain widths of the multiple third frequency domain ranges are same, the network device indicates, through the reserved value in the PRB grid offset field of the PBCH, the frequency domain width of the third frequency domain range and a position of an SSB in which the PBCH is located in the fourth frequency domain range; 2) when frequency domain widths of the multiple third frequency domain ranges are partially different, or when frequency domain widths of the multiple third frequency domain ranges are different from each other, the network device indicates, through the reserved value in the PRB grid offset field of the PBCH, the frequency domain width of the third frequency domain range i and a position of an SSB in which the PBCH is located in the fourth frequency domain range, and the third frequency domain range i is one of the multiple third frequency domain ranges; and 3) when frequency domain widths of the multiple third frequency domain ranges are partially different, or when frequency domain widths of the multiple third frequency domain ranges are different from each other, the network device indicates, through the reserved value in the PRB grid offset field of the PBCH, a position of an SSB in which the PBCH is located in the fourth frequency domain range.

It should be noted that a specific implementation of the content described in this implementation may refer to the above method described in FIG. 4A, and will not be described herein.

Figure 7:
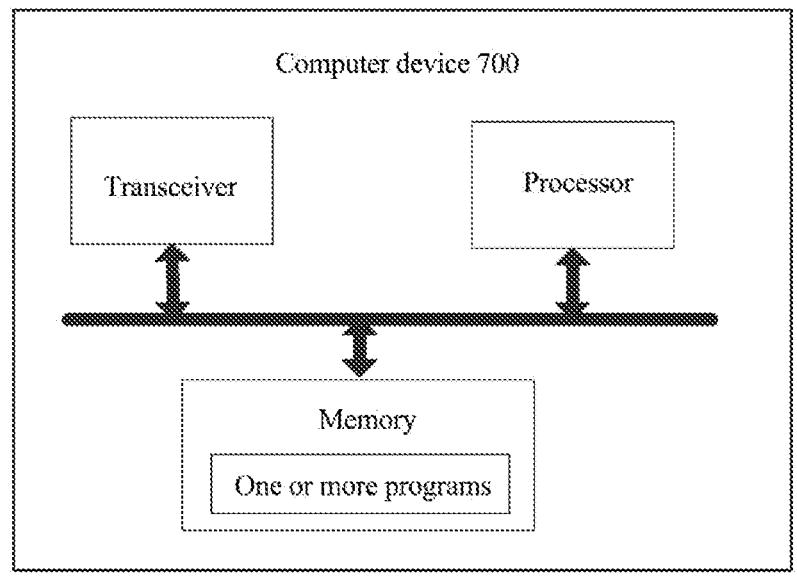
FIG. 7 is a schematic diagram of a structure of another computer device according to an implementation of the present disclosure.

Please refer to FIG. 7. FIG. 7 is a computer device 700 provided by an implementation of the present disclosure. The computer device 700 is applied to a communication system including a network device and a user equipment. The computer device 700 may be a user equipment or a network device. The computer device 700 includes one or more processors, one or more memories, one or more transceivers, and one or more programs; and the one or more programs are stored in the memories, and configured to be executed by the one or more processors.

In an implementation, when the computer device 700 is a network device, the programs include instructions for performing following acts: sending an indication to the user equipment, wherein the indication is used to indicate that an SSB exists at a first frequency location.

Optionally, the SSB is associated with RMSI.

Optionally, in an aspect of sending an indication to the user equipment, wherein the indication is used to indicate that an SSB exists at a first frequency location, the programs include instructions specifically for performing following acts: sending a first message to the user equipment, wherein the first message is used to indicate the first frequency location; and sending a second message to the user equipment, wherein the second message is used to indicate the SSB exists at the first frequency location.

Optionally, the network device carries the first message in a first field in a PBCH, wherein the first field reuses a field for indicating a frequency location of an SSB, or the first field reuses a field for CORESET of RMSI.

Optionally, the network device carries the second message through a reserved value in a Physical Resource Block (PRB) grid offset field of a Physical Broadcast Channel (PBCH).

In an implementation, when the computer device 700 is a user equipment, the programs include instructions for performing following acts: receiving an indication from a network device, wherein the indication is used to indicate that an SSB exists at a first frequency location; and detecting the SSB based on the indication.

Optionally, the SSB is associated with RMSI.

Optionally, in an aspect of receiving an indication from a network device, wherein the indication is used to indicate that an SSB exists at a first frequency location, the programs include instructions specifically for performing following acts: receiving a first message from the user equipment, wherein the first message is used to indicate the first frequency location; and receiving a second message from the user equipment, wherein the second message is used to indicate that the SSB exists at the first frequency location.

Optionally, the network device carries the first message in a first field in a PBCH, wherein the first field reuses a field for indicating a frequency location of an SSB, or the first field reuses a field for CORESET of RMSI.

Optionally, the network device carries the second message through a reserved value in a Physical Resource Block (PRB) grid offset field of a Physical Broadcast Channel (PBCH).

It should be noted that a specific implementation of the content described in this implementation may refer to the above method described in FIG. 5, and will not be described herein.

Figure 8:
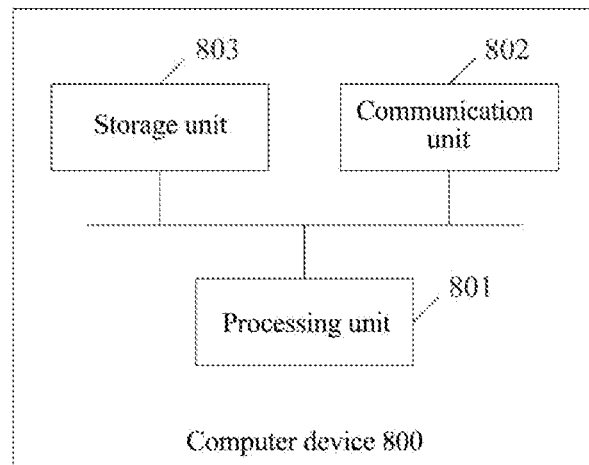
FIG. 8 is a schematic diagram of a structure of another computer device according to an implementation of the present disclosure.

Please refer to FIG. 8. FIG. 8 is a computer device 800 provided by an implementation of the present disclosure. The computer device 800 is applied to a communication system including a user equipment and a network device. The computer device 800 may be a user equipment or a network device. The user equipment 800 includes a processing unit 801, a communication unit 802 and a storage unit 803.

In an implementation, when the computer device 800 is a network device, the processing unit 801 is configured to send an indication to a user equipment through the communication unit 802, wherein the indication is used to indicate that there is no SSB within a first frequency range.

Optionally, the SSB is associated with RMSI.

Optionally, in an aspect of sending an indication to a user equipment through the communication unit 802, wherein the indication is used to indicate that there is no SSB within a first frequency range, the processing unit 801 is specifically configured to: sending a first message to the user equipment through the communication unit 802, wherein the first message is used to indicate the first frequency range; and sending a second message to the user equipment through the communication unit 802, wherein the second message is used to indicate that there is no SSB within the first frequency range.

Optionally, the network device carries the first message in a first field in a PBCH, wherein the first field reuses a field for indicating a frequency location of an SSB, or the first field reuses a field for CORESET of RMSI.

Optionally, the network device carries the second message through a reserved value in a Physical Resource Block (PRB) grid offset field of a Physical Broadcast Channel (PBCH).

Optionally, an indication mode of the first message includes one of following: 1) the first message includes first information and second information, wherein the first information is used to indicate a starting point of the first frequency range, the second information is used to indicate an ending point of the first frequency range, and a length of the first information is the same as a length of the second information, or a length of the first information is different from that of the second information; 2) the first message is used to indicate a starting point of the first frequency range; 3) the first message is used to indicate an ending point of the first frequency range.

Optionally, the indication mode used by the first message is predefined, or the indication mode used by the first message is indicated by the network device through a reserved value in a Physical Resource Block (PRB) grid offset field of a Physical Broadcast Channel (PBCH).

Optionally, an indication step size with which the first information indicates the starting point of the first frequency range and/or an indication step size with which the second information indicates the ending point of the first frequency range is predefined, or is indicated by the network device through the reserved value in the PRB grid offset field of the PBCH.

Optionally, in an aspect of sending an indication to the user equipment through the communication unit 802, wherein the indication is used to indicate that there is no SSB within the first frequency range, the processing unit 801 is specifically configured to: sending a third message to the user equipment through the communication unit 802, wherein the third message is used to indicate that there is no SSB within the first frequency range.

Optionally, the network device carries the third message through a second field in a PBCH, wherein the second field reuses a field for indicating a frequency location of an SSB, or the second field reuses a field for CORESET of RMSI.

Optionally, the third message includes multiple first bits, wherein each first bit corresponds to one second frequency domain range, the multiple second frequency domain ranges corresponding to the multiple first bits constitute a frequency band which can be indicated by a PBCH, and when a value of the first bit x is equal to a first set value, the second frequency domain range corresponding to the first bit x is the first frequency range, and the first bit x is one of the multiple bits.

Optionally, the multiple second frequency domain ranges have a proportional relationship, wherein the proportional relationship is predefined.

Optionally, the third message includes multiple second bits, wherein each second bit corresponds to one third frequency domain range, the multiple third frequency domain ranges corresponding to the multiple second bits constitute a fourth frequency domain range, a frequency band which can be indicated by a PBCH includes the fourth frequency domain range, and when a value of the second bit y is equal to a second set value, the third frequency domain range corresponding to the second bit y is the first frequency range, and the second bit y is one of the multiple bits.

Optionally, frequency domain widths of the multiple third frequency domain ranges are the same, or frequency domain widths of the multiple third frequency domain ranges are partially different, or frequency domain widths of the multiple third frequency domain ranges are different from each other.

Optionally, when the frequency domain widths of the multiple third frequency domain ranges are the same, the frequency domain width of the third frequency domain range is predefined, or the frequency domain width of the third frequency domain range is indicated by the network device through the reserved value in the PRB grid offset field of the PBCH.

Optionally, a positional relationship between the fourth frequency domain range and an SSB contained in the PBCH is predefined, or a positional relationship between the fourth frequency domain range and an SSB contained in the PBCH is indicated by the network device through a reserved value in a Physical Resource Block (PRB) grid offset field of a Physical Broadcast Channel (PBCH).

Optionally, the positional relationship between the fourth frequency domain range and the SSB included in the PBCH is indicated by the network device through the reserved value in the PRB grid offset field of the PBCH, includes one of following: 1) when frequency domain widths of the multiple third frequency domain ranges are same, the network device indicates, through the reserved value in the PRB grid offset field of the PBCH, the frequency domain width of the third frequency domain range and a position of an SSB in which the PBCH is located in the fourth frequency domain range; 2) when frequency domain widths of the multiple third frequency domain ranges are partially different, or when frequency domain widths of the multiple third frequency domain ranges are different from each other, the network device indicates, through the reserved value in the PRB grid offset field of the PBCH, the frequency domain width of the third frequency domain range i and a position of an SSB in which the PBCH is located in the fourth frequency domain range, and the third frequency domain range i is one of the multiple third frequency domain ranges; and 3) when frequency domain widths of the multiple third frequency domain ranges are partially different, or when frequency domain widths of the multiple third frequency domain ranges are different from each other, the network device indicates, through the reserved value in the PRB grid offset field of the PBCH, a position of an SSB in which the PBCH is located in the fourth frequency domain range.

In an implementation, when the computer device 800 is a user equipment, the processing unit 801 is configured to receive an indication from a network device through the communication unit 802, wherein the indication is used to indicate that there is no SSB within a first frequency range; and the processing unit 801 is further configured to detect the SSB based on the indication.

Optionally, the SSB is associated with RMSI.

Optionally, in an aspect of receiving an indication from a network device through the communication unit 802, wherein the indication is used to indicate that there is no SSB within a first frequency range, the processing unit 801 is specifically configured to: receiving a first message from the network device through the communication unit 802, wherein the first message is used to indicate the first frequency range; and receiving a second message from the network device through the communication unit 802, wherein the second message is used to indicate that there is no SSB within the first frequency range.

Optionally, the network device carries the first message in a first field in a PBCH, wherein the first field reuses a field for indicating a frequency location of an SSB, or the first field reuses a field for CORESET of RMSI.

Optionally, the network device carries the second message through a reserved value in a Physical Resource Block (PRB) grid offset field of a Physical Broadcast Channel (PBCH).

Optionally, an indication mode of the first message includes one of following: 1) the first message includes first information and second information, wherein the first information is used to indicate a starting point of the first frequency range, the second information is used to indicate an ending point of the first frequency range, and a length of the first information is the same as a length of the second information, or a length of the first information is different from that of the second information; 2) the first message is used to indicate a starting point of the first frequency range; 3) the first message is used to indicate an ending point of the first frequency range.

Optionally, the indication mode used by the first message is predefined, or the indication mode used by the first message is indicated by the network device through a reserved value in a Physical Resource Block (PRB) grid offset field of a Physical Broadcast Channel (PBCH).

Optionally, an indication step size with which the first information indicates the starting point of the first frequency range and/or an indication step size with which the second information indicates the ending point of the first frequency range is predefined, or is indicated by the network device through the reserved value in the PRB grid offset field of the PBCH.

Optionally, in an aspect of receiving an indication from a network device through the communication unit 802, wherein the indication is used to indicate that there is no SSB within a first frequency range, the processing unit 801 is specifically configured to: receiving a third message from the network device through the communication unit 802, wherein the third message is used to indicate that there is no SSB within the first frequency range.

Optionally, the network device carries the third message through a second field in a PBCH, wherein the second field reuses a field for indicating a frequency location of an SSB, or the second field reuses a field for CORESET of RMSI.

Optionally, the third message includes multiple first bits, wherein each first bit corresponds to one second frequency domain range, the multiple second frequency domain ranges corresponding to the multiple first bits constitute a frequency band which can be indicated by a PBCH, and when a value of the first bit x is equal to a first set value, the second frequency domain range corresponding to the first bit x is the first frequency range, and the first bit x is one of the multiple bits.

Optionally, the multiple second frequency domain ranges have a proportional relationship, wherein the proportional relationship is predefined.

Optionally, the third message includes multiple second bits, wherein each second bit corresponds to one third frequency domain range, the multiple third frequency domain ranges corresponding to the multiple second bits constitute a fourth frequency domain range, a frequency band which can be indicated by a PBCH includes the fourth frequency domain range, and when a value of the second bit y is equal to a second set value, the third frequency domain range corresponding to the second bit y is the first frequency range, and the second bit y is one of the multiple bits.

Optionally, frequency domain widths of the multiple third frequency domain ranges are the same, or frequency domain widths of the multiple third frequency domain ranges are partially different, or frequency domain widths of the multiple third frequency domain ranges are different from each other.

Optionally, when the frequency domain widths of the multiple third frequency domain ranges are the same, the frequency domain width of the third frequency domain range is predefined, or the frequency domain width of the third frequency domain range is indicated by the network device through the reserved value in the PRB grid offset field of the PBCH.

Optionally, a positional relationship between the fourth frequency domain range and an SSB contained in the PBCH is predefined, or a positional relationship between the fourth frequency domain range and an SSB contained in the PBCH is indicated by the network device through a reserved value in a Physical Resource Block (PRB) grid offset field of a Physical Broadcast Channel (PBCH).

Optionally, the positional relationship between the fourth frequency domain range and the SSB included in the PBCH is indicated by the network device through the reserved value in the PRB grid offset field of the PBCH, includes one of following: 1) when frequency domain widths of the multiple third frequency domain ranges are same, the network device indicates, through the reserved value in the PRB grid offset field of the PBCH, the frequency domain width of the third frequency domain range and a position of an SSB in which the PBCH is located in the fourth frequency domain range; 2) when frequency domain widths of the multiple third frequency domain ranges are partially different, or when frequency domain widths of the multiple third frequency domain ranges are different from each other, the network device indicates, through the reserved value in the PRB grid offset field of the PBCH, the frequency domain width of the third frequency domain range i and a position of an SSB in which the PBCH is located in the fourth frequency domain range, and the third frequency domain range i is one of the multiple third frequency domain ranges; and 3) when frequency domain widths of the multiple third frequency domain ranges are partially different, or when frequency domain widths of the multiple third frequency domain ranges are different from each other, the network device indicates, through the reserved value in the PRB grid offset field of the PBCH, a position of an SSB in which the PBCH is located in the fourth frequency domain range.

The processing unit 801 may be a processor or a controller (e.g., the processing unit 701 may be a Central Processing Unit (CPU), a general-purpose processor, a Digital Signal Processor (DSP), An Application-Specific Integrated Circuit (ASIC), a Field Programmable Gate Array (FPGA), or another programmable logic device, a transistor logic device, a hardware component, or any combination thereof. The processing unit 701 may implement or execute various illustrative logical blocks, modules, and circuits described in combination with disclosed contents of the present disclosure. Or, the processor may be a combination that implements computing functions, e.g., a combination that includes one or more microprocessors, a combination of a DSP and a microprocessor, etc.). The communication unit 802 may be a transceiver, a transceiving circuit, a radio chip, or a communication interface, etc., and the storage unit 803 may be a memory.

When the processing unit 801 is a processor, the communication unit 802 is a communication interface, and the storage unit 803 is a memory, the computer device involved in the implementations of the present disclosure may be the computer device shown in FIG. 6.

Figure 9:
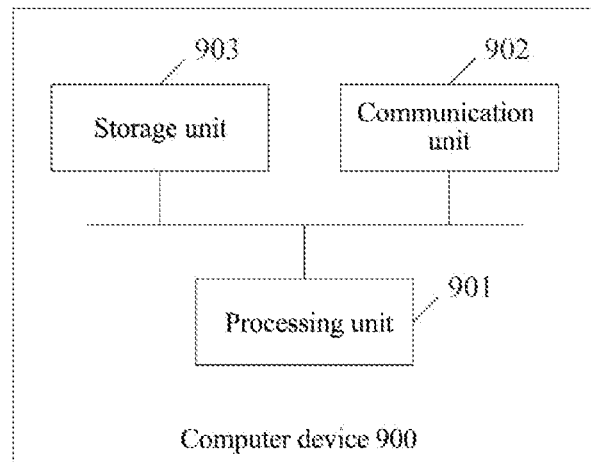
FIG. 9 is a schematic diagram of a structure of another computer device according to an implementation of the present disclosure.

Please refer to FIG. 9. FIG. 9 is a computer device 900 provided by an implementation of the present disclosure. The computer device 900 is applied to a communication system including a user equipment and a network device. The computer device 900 may be a user equipment or a network device. The user equipment 900 includes a processing unit 901, a communication unit 902, and a storage unit 903.

In an implementation, when the computer device 900 is a network device, the processing unit 901 is configured to send an indication to a user equipment through the communication unit, wherein the indication is used to indicate that an SSB exists at a first frequency location.

Optionally, the SSB is associated with RMSI.

Optionally, in an aspect of sending an indication to a user equipment through the communication unit 902, wherein the indication is used to indicate an SSB exists at a first frequency location, the processing unit 901 is specifically configured to: sending a first message to the user equipment through the communication unit 902, wherein the first message is used to indicate the first frequency location; and sending a second message to the user equipment through the communication unit 902, wherein the second message is used to indicate that the SSB exists at the first frequency location.

Optionally, the network device carries the first message in a first field in a PBCH, wherein the first field reuses a field for indicating a frequency location of an SSB, or the first field reuses a field for CORESET of RMSI.

Optionally, the network device carries the second message through a reserved value in a Physical Resource Block (PRB) grid offset field of a Physical Broadcast Channel (PBCH).

In an implementation, when the computer device 900 is a user equipment, the processing unit 901 is configured to receive an indication from a network device through the communication unit 902, wherein the indication is used to indicate that an SSB exists at a first frequency location; and the processing unit 901 is further configured to detect the SSB based on the indication.

Optionally, the SSB is associated with RMSI.

Optionally, in an aspect of receiving an indication from a network device through the communication unit 902, wherein the indication is used to indicate an SSB exists at a first frequency location, the processing unit 901 is specifically configured to: receiving a first message from the user equipment through the communication unit 902, wherein the first message is used to indicate the first frequency location; and receiving a second message from the user equipment through the communication unit 902, wherein the second message is used to indicate that the SSB exists at the first frequency location.

Optionally, the network device carries the first message in a first field in a PBCH, wherein the first field reuses a field for indicating a frequency location of an SSB, or the first field reuses a field for CORESET of RMSI.

Optionally, the network device carries the second message through a reserved value in a Physical Resource Block (PRB) grid offset field of a Physical Broadcast Channel (PBCH).

The processing unit 901 may be a processor or a controller (e.g., the processing unit 701 may be a Central Processing Unit (CPU), a general-purpose processor, a Digital Signal Processor (DSP), An Application-Specific Integrated Circuit (ASIC), a Field Programmable Gate Array (FPGA), or another programmable logic device, a transistor logic device, a hardware component, or any combination thereof. The processing unit 701 may implement or execute various illustrative logical blocks, modules, and circuits described in combination with disclosed contents of the present disclosure. Or, the processor may be a combination that implements computing functions, e.g., a combination that includes one or more microprocessors, a combination of a DSP and a microprocessor, etc.). The communication unit 902 may be a transceiver, a transceiving circuit, a radio chip, or a communication interface, etc., and the storage unit 803 may be a memory.

When the processing unit 901 is a processor, the communication unit 902 is a communication interface, and the storage unit 903 is a memory, the computer device involved in the implementations of the present disclosure may be the computer device shown in FIG. 7.

An implementation of the present disclosure further provides a computer readable storage medium, wherein the computer readable storage medium stores a computer program for electronic data interchange, wherein the computer program enables a computer to perform parts or all of the acts described for the user equipment or the network device in the above method implementations.

An implementation of the present disclosure further provides a computer program product, wherein the computer program product includes a non-transitory computer readable storage medium storing a computer program, and the computer program is operable to enable a computer to perform parts or all of the acts described for the user equipment or the network device in the above methods. The computer program product may be a software installation package.

The acts of the method or algorithm described in the implementations of the present disclosure may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An example storage medium is coupled to the processor such that the processor may read information from the storage medium, and write information to the storage medium. Of course, the storage medium may be a component of the processor. The processor and the storage medium may be located in an ASIC. In addition, the ASIC may be located in an access network device, a target network device, or a core network device. Or, the processor and the storage medium may act as separate components in the access network device, the target network device, or the core network device.

Those skilled in the art should realize that in one or more examples described above, the functions described in the implementations of the present disclosure may be implemented in whole or in parts through software, hardware, firmware, or any combination thereof. When the functions described in the implementations of the present disclosure are implemented through software, these functions may be implemented in whole or in parts in the form of a computer program product. The computer program product includes one or more computer instructions. When the computer program instructions are loaded and executed on a computer, the flows or functions according to the implementations of the present disclosure are generated in whole or in parts. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer may access, or a data storage device such as an integrated server or data center that includes one or more available medium. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The specific implementations described above give further explanation in detail. It should be understood that the above is only the specific implementations of implementations of the present disclosure, and is not used to limit the protection scope of implementations of the present disclosure. Any modification, equivalent substitution, improvement and the like, made on the basis of technical solutions of implementations of the present disclosure shall be included in the protection scope of implementations of the present disclosure.

The invention claimed is:

1. An indication method, comprising:
sending, by a network device, an indication to a user equipment, wherein the indication is used to indicate that there is no Synchronization Signal Block (SSB) associated with Remaining Minimum System Information (RMSI) within a first frequency range;
wherein sending, by the network device, the indication to the user equipment, wherein the indication is used to indicate that there is no SSB associated with RMSI within the first frequency range, comprises:
  sending, by the network device, a Physical Broadcast Channel (PBCH) to the user equipment, wherein the PBCH comprises a first field and a second field; wherein the first field carries information of the first frequency range, and the second field carries information which is used to indicate that there is no SSB within the first frequency range;
wherein the information of the first frequency range comprises first information and second information, the first information is used to indicate a starting point of the first frequency range, the second information is used to indicate an ending point of the first frequency range, and a length of the first information is the same as a length of the second information.

2. The method according to claim 1, wherein the first field is a field used for carrying information of Control Resource Set (CORESET) of RMSI, and the second field is a Physical Resource Block (PRB) grid offset field.

3. The method according to claim 2, wherein information of the second field is a reserved value of the PRB grid offset field, and the reserved value of the PRB grid offset field is used to indicate that there is no SSB within the first frequency range.

4. The method according to claim 1, wherein an indication step size with which the first information indicates the starting point of the first frequency domain range and an indication step size with which the second information indicates the ending point of the first frequency domain range is predefined.

5. A detection method, comprising:
receiving, by a user equipment, an indication from a network device, wherein the indication is used to indicate that there is no Synchronization Signal Block (SSB) associated with Remaining Minimum System Information (RMSI) within a first frequency range; and
performing, by the user equipment, SSB detection based on the indication;
wherein receiving, by the user equipment, the indication from the network device, wherein the indication is used to indicate that there is no SSB associated with RMSI within the first frequency range, comprises:
  receiving, by the user equipment, a Physical Broadcast Channel (PBCH) from the network device, wherein the PBCH comprises a first field and a second field; wherein the first field carries information of the first frequency range, and the second field carries information which is used to indicate that there is no SSB within the first frequency range;
wherein the information of the first frequency range comprises first information and second information, the first information is used to indicate a starting point of the first frequency range, the second information is used to indicate an ending point of the first frequency range, and a length of the first information is the same as a length of the second information.

6. The method according to claim 5, wherein the first field is a field used for carrying information of Control Resource Set (CORESET) of RMSI, and the second field is a Physical Resource Block (PRB) grid offset field.

7. The method according to claim 6, wherein the information of the second field is a reserved value of the PRB grid offset field, and the reserved value of the PRB grid offset field is used to indicate that there is no SSB within the first frequency range.

8. The method according to claim 5, wherein an indication step size with which the first information indicates the starting point of the first frequency domain range and an indication step size with which the second information indicates the ending point of the first frequency domain range is predefined.

9. A network device, comprising a processor, a memory and a transceiver; wherein the processor is used for reading instructions stored in the memory to perform an act of:
sending an indication to a user equipment through the transceiver, wherein the indication is used to indicate that there is no Synchronization Signal Block (SSB) associated with Remaining Minimum System Information (RMSI) within a first frequency range;
wherein sending the indication to the user equipment through the transceiver, wherein the indication is used to indicate that there is no SSB associated with RMSI within the first frequency range, comprises:
sending a Physical Broadcast Channel (PBCH) to the user equipment, wherein the PBCH comprises a first field and a second field; wherein the first field carries information of the first frequency range, and the second field carries information which is used to indicate that there is no SSB within the first frequency range;
wherein the information of the first frequency range comprises first information and second information, the first information is used to indicate a starting point of the first frequency range, the second information is used to indicate an ending point of the first frequency range, and a length of the first information is the same as a length of the second information.

10. The network device according to claim 9, wherein the first field is a field used for carrying information of Control Resource Set (CORESET) of RMSI, and the second field is a Physical Resource Block (PRB) grid offset field.

11. The network device according to claim 10, wherein information of the second field is a reserved value of the PRB grid offset field, and the reserved value of the PRB grid offset field is used to indicate that there is no SSB within the first frequency range.

12. The method according to claim 9, wherein an indication step size with which the first information indicates the starting point of the first frequency domain range and an indication step size with which the second information indicates the ending point of the first frequency domain range is predefined.

13. A user equipment, comprising a processor, a memory and a transceiver; wherein the processor is used for reading instructions stored in the memory to perform following acts:
receiving an indication from a network device through the transceiver, wherein the indication is used to indicate that there is no Synchronization Signal Block (SSB) associated with Remaining Minimum System Information (RMSI) within a first frequency range; and
performing SSB detection based on the indication;
wherein receiving the indication from the network device, wherein the indication is used to indicate that there is no SSB associated with RMSI within the first frequency range, comprises:
receiving a Physical Broadcast Channel (PBCH) from the network device, wherein the PBCH comprises a first field and a second field; wherein the first field carries information of the first frequency range, and the second field carries information which is used to indicate that there is no SSB within the first frequency range;
wherein the information of the first frequency range comprises first information and second information, the first information is used to indicate a starting point of the first frequency range, the second information is used to indicate an ending point of the first frequency range, and a length of the first information is the same as a length of the second information.

14. The user equipment according to claim 13, wherein the first field is a field used for carrying information of Control Resource Set (CORESET) of RMSI, and the second field is a Physical Resource Block (PRB) grid offset field.

15. The user equipment according to claim 14, wherein the information of the second field is a reserved value of the PRB grid offset field, and the reserved value of the PRB grid offset field is used to indicate that there is no SSB within the first frequency range.

16. The method according to claim 13, wherein an indication step size with which the first information indicates the starting point of the first frequency domain range and an indication step size with which the second information indicates the ending point of the first frequency domain range is predefined.

* * * * *